US012438622B2

(12) United States Patent
Kang et al.

(10) Patent No.: US 12,438,622 B2
(45) Date of Patent: Oct. 7, 2025

(54) ELECTRONIC DEVICE COMPRISING PLURALITY OF ANTENNAS

(71) Applicant: Samsung Electronics Co., Ltd., Suwon-si (KR)

(72) Inventors: Youngjin Kang, Suwon-si (KR); Dongil Son, Suwon-si (KR); Jaehoon Song, Suwon-si (KR); Ungryeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 18/086,094

(22) Filed: Dec. 21, 2022

(65) Prior Publication Data

US 2023/0119719 A1 Apr. 20, 2023

Related U.S. Application Data

(63) Continuation of application No. PCT/KR2021/006528, filed on May 26, 2021.

(30) Foreign Application Priority Data

Jun. 26, 2020 (KR) .................. 10-2020-0078496

(51) Int. Cl.
*H04B 17/11* (2015.01)
*H01Q 1/24* (2006.01)
(Continued)

(52) U.S. Cl.
CPC ............ *H04B 17/11* (2015.01); *H01Q 1/243* (2013.01); *H01Q 5/25* (2015.01); *H01Q 9/0407* (2013.01); *H04B 1/719* (2013.01)

(58) Field of Classification Search
CPC .................................................. H04B 17/11
(Continued)

(56) References Cited

U.S. PATENT DOCUMENTS 7,436,908 B2    10/2008  You et al.
7,643,811 B2     1/2010  Reunamaki et al.
(Continued)

FOREIGN PATENT DOCUMENTS

JP    2017/152830 A    8/2017
KR    10-0834644 B1    6/2008
(Continued)

OTHER PUBLICATIONS

European Search Report dated Nov. 17, 2023, issued in European Application No. 21828361.2.
(Continued)

*Primary Examiner* — Lihong Yu
(74) *Attorney, Agent, or Firm* — Jefferson IP Law, LLP

(57) ABSTRACT

An electronic device is provided. The electronic device includes a first millimeter wave (mmWave) antenna module including a first array antenna, an intermediate frequency (IF) circuit electrically connected to the first mmWave antenna module through a first path, an ultra-wide band (UWB) antenna disposed to be adjacent to the first path, a UWB circuit electrically connected to the UWB antenna, and at least one processor electrically connected to the IF circuit and the UWB circuit, wherein the at least one processor controls the IF circuit to provide a signal of a first frequency band to the first mmWave antenna module, controls the UWB circuit to acquire, through the UWB antenna, a signal of a second frequency band partially overlapping the first frequency band, and may deactivate the UWB antenna or stop communication using the first mmWave antenna module according to whether a specified condition associated with the UWB antenna is satisfied.

15 Claims, 12 Drawing Sheets

(51) Int. Cl.
  *H01Q 5/25* (2015.01)
  *H01Q 9/04* (2006.01)
  *H04B 1/719* (2011.01)

(58) Field of Classification Search
  USPC .......................................................... 375/230
  See application file for complete search history.

(56) References Cited

U.S. PATENT DOCUMENTS

| | | | |
|---|---|---|---|
| 9,392,391 | B2 | 7/2016 | Luo |
| 11,047,702 | B1* | 6/2021 | Meyer ................. G01C 21/3632 |
| 2004/0223535 | A1 | 11/2004 | You et al. |
| 2007/0066361 | A1 | 3/2007 | Knudsen et al. |
| 2009/0213901 | A1 | 8/2009 | Berens |
| 2012/0087341 | A1 | 4/2012 | Jang et al. |
| 2013/0141294 | A1 | 6/2013 | Rappaport |
| 2015/0023306 | A1 | 1/2015 | Li et al. |
| 2017/0195033 | A1* | 7/2017 | Zhang ................. H04W 72/046 |
| 2019/0052345 | A1 | 2/2019 | Yunoki |
| 2019/0317177 | A1 | 10/2019 | Ertan et al. |
| 2020/0036083 | A1 | 1/2020 | Kim et al. |
| 2020/0144713 | A1 | 5/2020 | Jung et al. |
| 2020/0161763 | A1 | 5/2020 | Lee et al. |
| 2020/0275369 | A1* | 8/2020 | Foster ................. H04W 52/0225 |
| 2021/0144729 | A1 | 5/2021 | Kim et al. |
| 2021/0304535 | A1* | 9/2021 | Studerus ............ G07C 9/00309 |
| 2021/0306062 | A1* | 9/2021 | Zhou .................... H04B 7/0877 |

FOREIGN PATENT DOCUMENTS

| | | |
|---|---|---|
| KR | 10-2010-0107528 A | 10/2010 |
| KR | 10-2016-0042186 A | 4/2016 |
| KR | 10-2017-0084632 A | 7/2017 |
| KR | 10-1928448 B1 | 12/2018 |
| KR | 10-2020-0012106 A | 2/2020 |
| KR | 10-2020-0052611 A | 5/2020 |
| KR | 10-2020-0058153 A | 5/2020 |
| KR | 10-2021-0058077 A | 5/2021 |
| KR | 10-2021-0111539 A | 9/2021 |
| KR | 10-2022-0062044 A | 5/2022 |

OTHER PUBLICATIONS

Korean Office Action dated Jul. 12, 2024, issued in Korean Patent Application No. 10-2020-0078496.
Korean Notice of Final Rejection dated Mar. 20, 2025, issued in Korean Patent Application No. 10-2020-0078496.
Korean Notice of Patent Grant dated Jul. 28, 2025, issued in Korean Patent Application No. 10-2020-0078496.

* cited by examiner

ELECTRONIC DEVICE COMPRISING PLURALITY OF ANTENNAS

CROSS-REFERENCE TO RELATED APPLICATION(S)

This application is a continuation application, claiming priority under § 365(c), of an International application No. PCT/KR2021/006528, filed on May 26, 2021, which is based on and claims the benefit of a Korean patent application number 10-2020-0078496, filed on Jun. 26, 2020, in the Korean Intellectual Property Office, the disclosure of which is incorporated by reference herein in its entirety.

BACKGROUND

1. Field

The disclosure relates to an electronic device including a plurality of antennas.

2. Description of Related Art

In order to meet the demand for wireless data traffic, which has been increasing since $4^{th}$ generation (4G) communication systems were commercialized, enhanced $5^{th}$ generation (5G) communication systems or pre-5G communication systems are developing. A 5G communication system may use a millimeter wave (mmWave) frequency (for example, 24-86 GHz or higher) band in order to guarantee a wide bandwidth.

On the other hand, ultra-wide band (UWB) communication refers to a communication technology that uses a wide frequency band in a broad sense, and refers to a radio transmission technology that occupies a frequency bandwidth of 20% or more around a center frequency, or a bandwidth of 500 MHz or more. For example, the UWB communication technology may be used to detect a position of an external device, based on a UWB signal transmitted and received between an electronic device and the external device.

The above information is presented as background information only to assist with an understanding of the disclosure. No determination has been made, and no assertion is made, as to whether any of the above might be applicable as prior art with regard to the disclosure.

SUMMARY

An electronic device may support two or more communication systems. For example, an electronic device may support a 5th generation (5G) communication system and the UWB communication system described above. The electronic device may include an mmWave antenna module for the 5G communication system, and a UWB antenna for the UWB communication system.

However, frequency bands used in the communication systems supported by the electronic device may collide with each other. For example, a frequency band of 8 GHz to 10 GHz of an intermediate frequency (IF) signal which is used in the 5G communication system may overlap a frequency band of channel 9 to channel 15 according to the IEEE 802.15.4a communication protocol which is used in the UWB communication system. When the 5G communication system and the UWB communication system operate at the same time, communication performance may be degraded due to a collision between the frequency bands and a noise therebetween.

Aspects of the disclosure are to address at least the above-mentioned problems and/or disadvantages and to provide at least the advantages described below. Accordingly, and aspect of the disclosure is to provide an electronic device comprising plurality of antennas.

Additional aspects will be set forth in part in the description which follows and, in part, will be apparent from the description, or may be learned by practice of the presented embodiments.

In accordance with an aspect of the disclosure, an electronic device is provided. The electronic device includes a first mmWave antenna module including a first array antenna, an intermediate frequency (IF) circuit electrically connected with the first mmWave antenna module through a first path, an ultra-wide band (UWB) antenna disposed adjacent to the first path, a UWB circuit electrically connected with the UWB antenna, and at least one processor electrically connected with the IF circuit and the UWB circuit, and the at least one processor may control the IF circuit to provide a signal of a first frequency band to the first mmWave antenna module, control the UWB circuit to acquire a signal of a second frequency band overlapping the first frequency band in part through the UWB antenna, and disable the UWB antenna or stop communication using the first mmWave antenna module according to whether a designated condition related to the UWB antenna is satisfied.

In accordance with another aspect of the disclosure, an electronic device is provided. The electronic device includes a first millimeter wave (mmWave) antenna module including a first array antenna, a second mmWave antenna module including a second array antenna, a third mmWave antenna module including a third array antenna, an intermediate frequency (IF) circuit electrically connected with the first mmWave antenna module, the second mmWave antenna module, and the third mmWave antenna module, an ultra-wide band (UWB) antenna disposed closer to the first mmWave antenna module than to the second mmWave antenna module and the third mmWave antenna module, a UWB circuit electrically connected with the UWB antenna, and at least one processor electrically connected with the IF circuit and the UWB circuit, and the at least one processor may perform communication by using at least one of the first mmWave antenna module, the second mmWave antenna module, and the third mmWave antenna module, perform communication by using the UWB antenna, identify whether the first mmWave antenna module is operating, in response to identifying that the first mmWave antenna module is operating, stop the communication using the UWB antenna, and, in response to identifying that the first mmWave antenna module is not operating, maintain the communication using the UWB antenna.

In accordance with another aspect of the disclosure, an electronic device is provided. The electronic device includes a first millimeter wave (mmWave) antenna module including a first array antenna, a second mmWave antenna module including a second array antenna, a third mmWave antenna module including a third array antenna, an intermediate frequency (IF) circuit electrically connected with the first mmWave antenna module, the second mmWave antenna module, and the third mmWave antenna module, an ultra-wide band (UWB) antenna disposed closer to the first mmWave antenna module than to the second mmWave antenna module and the third mmWave antenna module, a UWB circuit electrically connected with the UWB antenna, and at least one processor electrically connected with the IF circuit and the UWB circuit, and the at least one processor may perform communication by using at least one of the first mmWave antenna module, the second mmWave antenna module, and the third mmWave antenna module, based on a first beam set, identify whether the UWB antenna is operating while performing the communication based on the first beam set, and maintain the communication based on the first beam set or perform communication based on a second beam set, based on the identification.

According to an embodiment, the electronic device may reduce communication interference occurring when UWB communication and 5G communication are performed at the same time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
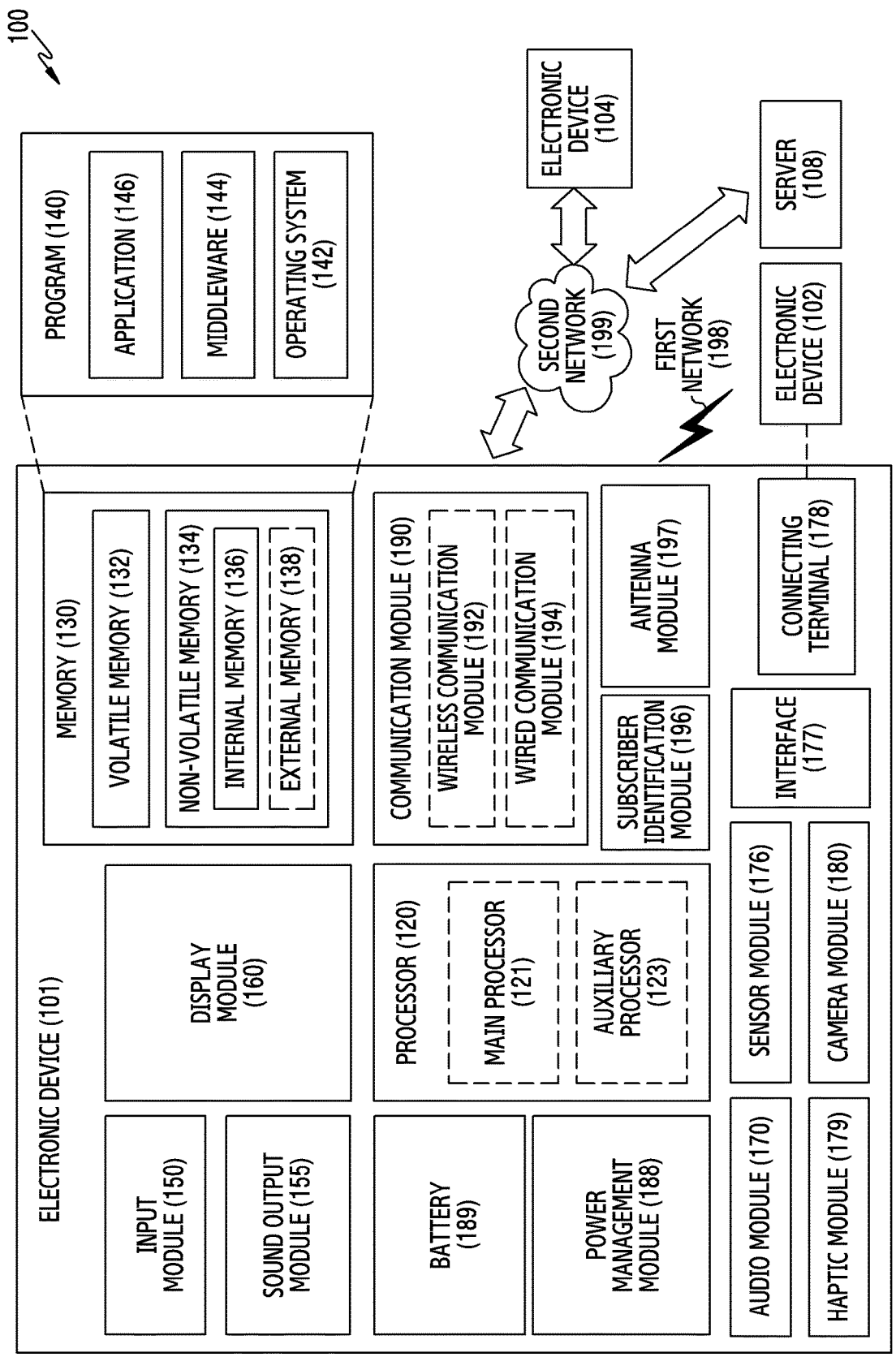
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
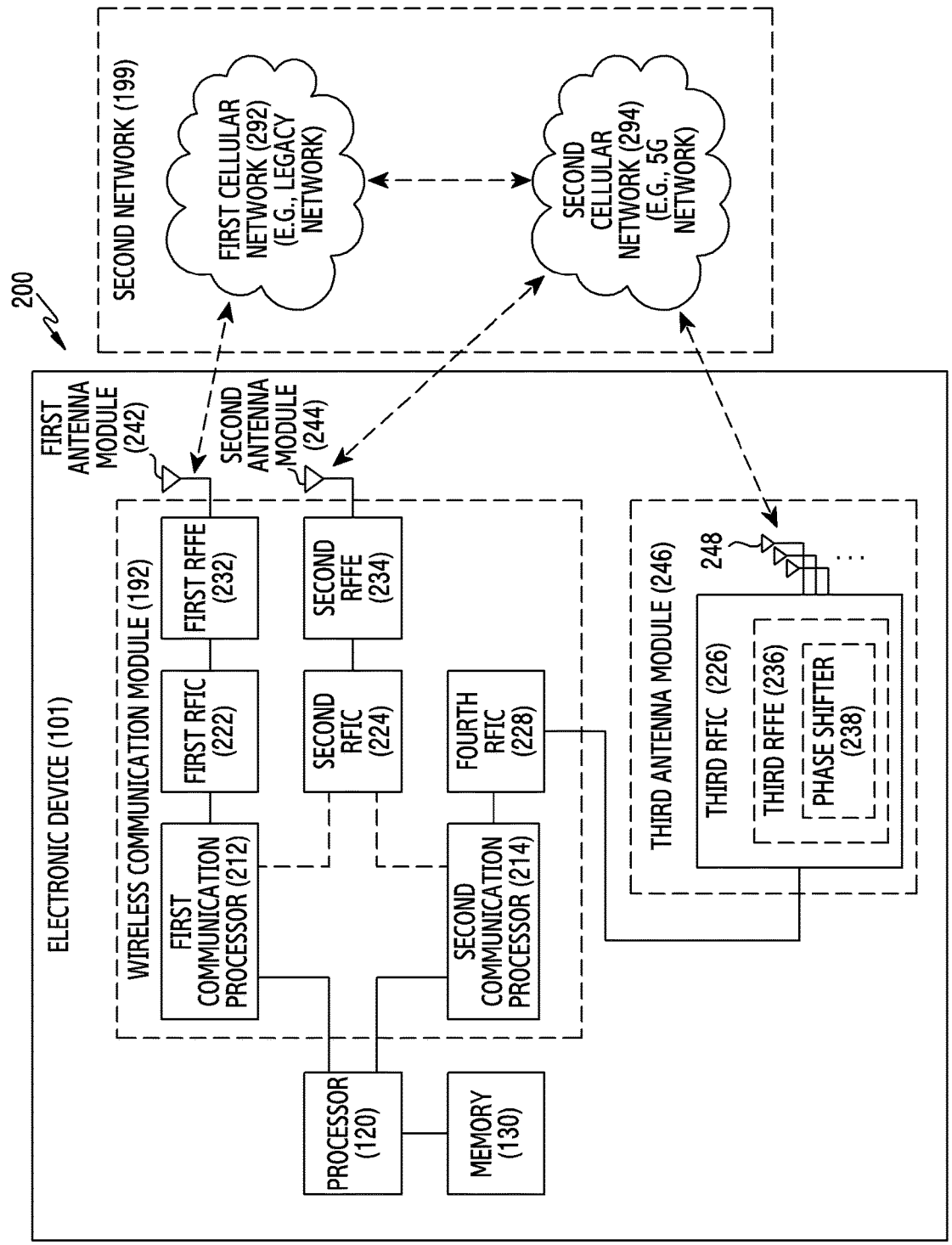
FIG. 2 is a block diagram of an electronic device for supporting legacy network communication and 5th generation (5G) network communication according to an embodiment of the disclosure.

FIG. 2 is a block diagram 200 of an electronic device 101 for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or may be included as part of the third RFIC 226.

The first communication processor 212 may support establishing a communication channel of a band to be used for wireless communication with the first network 292, and may support legacy network communication via the established communication channel According to various embodiments, the first network may be a legacy network including a second generation (2G), third-generation (3G), fourth-generation (4G), or long term evolution (LTE) network. The second communication processor 214 may support establishing a communication channel corresponding to a designated band (for example, about 6 GHz to about 60 GHz) among bands to be used for wireless communication with the second network 294, and may support 5G network communication via the established communication channel According to various embodiments, the second network 294 may be a 5G network which is defined in third generation partnership project (3GPP). Additionally, according to an embodiment, the first communication processor 212 or the second communication processor 214 may support establishing a communication channel corresponding to another designated band (for example, about 6 GHz or lower) among the bands to be used for wireless communication with the second network 294, and may support 5G network communication via the established communication channel According to an embodiment, the first communication processor 212 and the second communication processor 214 may be implemented within a single chip or a single package. According to various embodiments, the first communication processor 212 or the second communication processor 214 may be formed within the single chip or the single package, with the processor 120, an auxiliary processor 123, or a communication module 190.

When transmitting signals, the first RFIC 222 may convert a baseband signal, which is generated by the first communication processor 212, into a radio frequency (RF) signal of about 700 MHz to about 3 GHz to be used in the first network 292 (for example, a legacy network). When signals are received, an RF signal may be acquired from the first network 292 (for example, the legacy network) via an antenna (for example, the first antenna module 242), and may be pre-processed through an RFFE (for example, the first RFFE 232). The first RFIC 222 may convert the pre-processed RF signal into a baseband signal to be processed by the first communication processor 212.

When transmitting signals, the second RFIC 224 may convert a baseband signal, which is generated by the first communication processor 212 or the second communication processor 214, into an RF signal (hereinafter, a 5G Sub6 RF signal) of a Sub6 band (for example, about 6 GHz or lower) to be used in the second network 294 (for example, a 5G network). When signals are received, a 5G Sub6 RF signal may be acquired from the second network 294 (for example, the 5G network) via an antenna (for example, the second antenna module 244), and may be pre-processed through an RFFE (for example, the second RFFE 234). The second RFIC 224 may convert the pre-processed 5G Sub6 RF signal into a baseband signal to be processed by a corresponding communication processor among the first communication processor 212 or the second communication processor 214.

The third RFIC 226 may convert a baseband signal, which is generated by the second communication processor 214, into an RF signal (hereinafter, a 5G Above6 RF signal) of a 5G Above6 band (for example, about 6 GHz to about 60 GHz) to be used in the second network 294 (for example, the 5G network). When signals are received, a 5G Above6 RF signal may be acquired from the second network 294 (for example, the 5G network) via an antenna (for example, the antenna 248), and may be pre-processed through the third RFFE 236. The third RFIC 226 may convert the pre-processed 5G Above6 RF signal into a baseband signal to be processed by the second communication processor 214. According to an embodiment, the third RFFE 236 may be formed as part of the third RFIC 226.

According to an embodiment, the electronic device 101 may include the fourth RFIC 228 as separate from or as part of the third RFIC 226. In this case, the fourth RFIC 228 may convert a baseband signal, which is generated by the second communication processor 214, into an RF signal of an intermediate frequency band (for example, about 9 GHz to about 11 GHz) (hereinafter, an IF signal), and then may transfer the IF signal to the third RFIC 226. The third RFIC 226 may convert the IF signal into a 5G Above6 RF signal. When signals are received, a 5G Above6 RF signal may be received from the second network 294 (for example, the 5G network) via an antenna (for example, the antenna 248), and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as part of a single chip or single package. According to an embodiment, the first RFFE 232 and the second RFFE 234 may be implemented as part of a single chip or a single package. According to an embodiment, at least one antenna module of the first antenna module 242 or the second antenna module 244 may be omitted, or may be coupled with another antenna module to process corresponding RF signals of a plurality of frequency bands.

According to an embodiment, the third RFIC 226 and the antenna 248 may be disposed on the same substrate to form a third antenna module 246. For example, the wireless communication module 192 or the processor 120 may be disposed on a first substrate (for example, a main PCB). In this case, the third antenna module 246 may be formed with the third RFIC 226 being disposed on an area (for example, a lower surface) of a second substrate (for example, a sub PCB) separate from the first substrate, and the antenna 1248 being disposed on another area (for example, an upper surface). The third RFIC 226 and the antenna 248 may be disposed on the same substrate, so that a length of a transmission line therebetween may be reduced. This may reduce loss (for example, attenuation) of a signal of a high frequency band (for example, about 6 GHz to about 60 GHz) used for 5G network communication, which is caused by the transmission line. Accordingly, the electronic device 101 may enhance quality or speed of communication with the second network 294 (for example, the 5G network).

According to an embodiment, the antenna 248 may be formed as an array antenna including a plurality of antenna elements to be used for beamforming. In this case, the third RFIC 226 may include a plurality of phase shifters 238 corresponding to the plurality of antenna elements, as part of the third RFFE 236. When transmitting signals, the plurality of phase shifters 238 may shift phases of 5G Above6 RF signals to be transmitted to the outside (for example, a base station of the 5G network) of the electronic device 1101 via corresponding antenna elements. When receiving signals, the plurality of phase shifters 238 may shift phases of 5G Above6 RF signals received from the outside through corresponding antenna elements to the same phases or substantially the same phases. This makes it possible to transmit or receive through beamforming between the electronic device 101 and the outside.

The second network 294 (for example, the 5G network) may be operated independently from the first network 292 (for example, the legacy network) (for example, stand-alone (SA)), or may be operated in conjunction therewith (for example, non-stand alone (NSA)). For example, the 5G network may include only an access network (for example, a 5G radio access network (RAN) or a next generation RAN (NG RAN)), and may not include a core network (for example, a next generation core (NGC)). In this case, after accessing the access network of the 5G network, the electronic device 101 may access an external network (for example, Internet) under control of the core network of the legacy network (for example, an evolved packed core (EPC)). Protocol information (for example, LTE protocol information) for communication with the legacy network or protocol information (for example, new radio (NR) protocol information) for communication with the 5G network may be stored in the memory 230, and may be accessed by other components (for example, the processor 120, the first communication processor 212, or the second communication processor 214).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
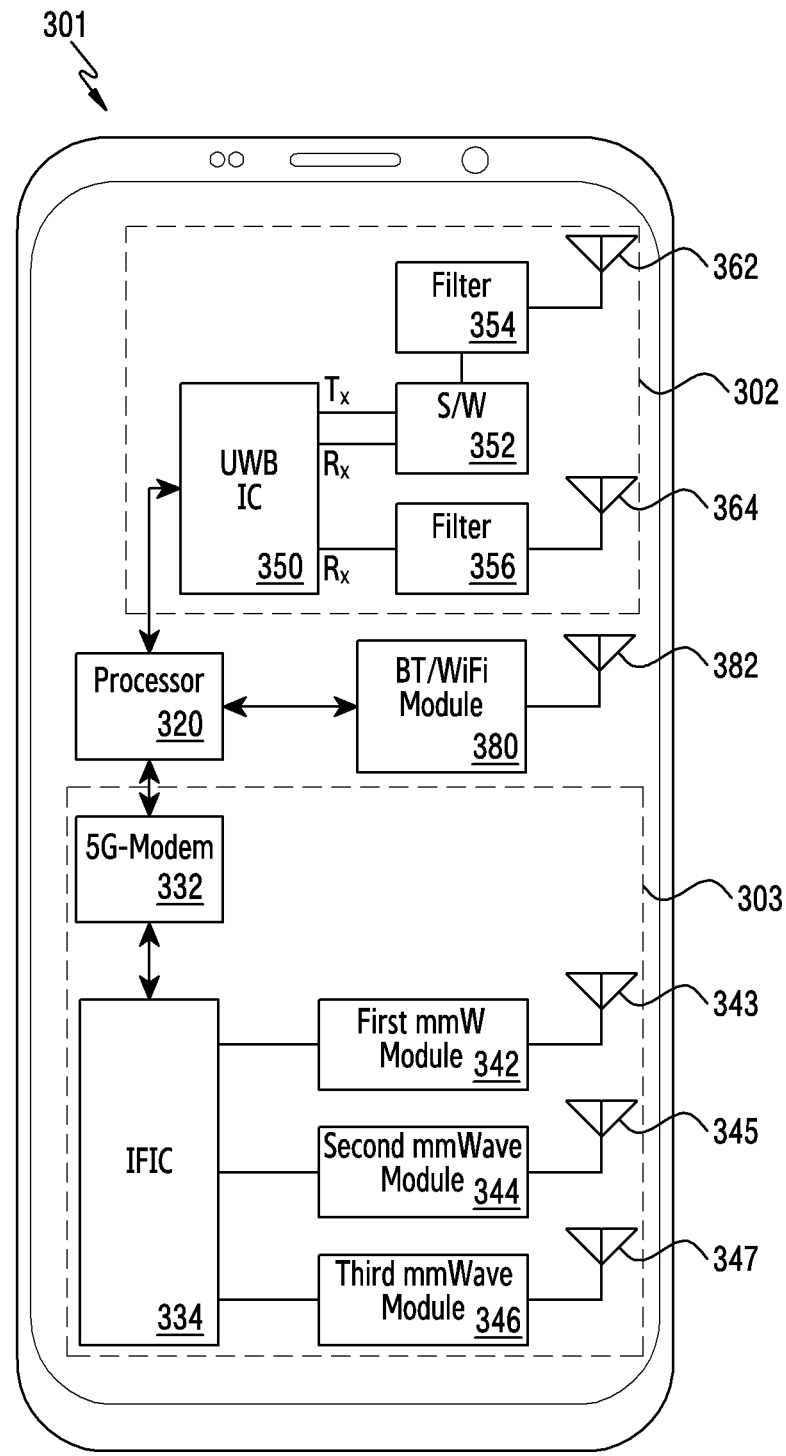
FIG. 3 is a view illustrating an electronic device according to an embodiment of the disclosure.

FIG. 3 illustrates an electronic device according to an embodiment of the disclosure.

The electronic device 301 (for example, the electronic device 101 of FIG. 1) according to an embodiment may include a component that is not illustrated in FIG. 3. For example, the electronic device 301 may include at least one of components of the electronic device 101 of FIGS. 1 and 2.

Referring to FIG. 3, the electronic device 301 according to an embodiment may include a processor 320, a UWB communication system 302, a 5G communication system 303, a Bluetooth (BT)/Wi-Fi module 380, and a third antenna 382.

In an embodiment, the processor 320 may include at least one processor. For example, the processor 320 may include an application processor (for example, the processor 120 of FIG. 1) and/or a communication processor (for example, the communication module 190 of FIG. 1).

In an embodiment, the UWB communication system 302 may include a UWB integrated circuitry (UWB IC) 350, a switch 352, filters 354, 356, a first antenna 362, and a second antenna 364.

In an embodiment, the UWB IC 350 may be electrically connected with the processor 320. The UWB IC 350 may include a processing circuitry for controlling the switch 352 operatively coupled with the UWB IC 350, the filters 354, 356, the first antenna 362, and the second antenna 364, and for processing signals transmitted and received through the first antenna 362 and the second antenna 364. The processing circuitry of the UWB IC 350 may include at least one processor. In an embodiment, at least part of the UWB IC 350 may be integrated with the processor 320. In this case, the processor 320 may perform at least part of functions of the UWB IC 350.

In an embodiment, the switch 352 may be electrically connected with the UWB IC 350 and the filter 354. The switch 352 may be disposed between the UWB IC 350 and the filter 354. In an embodiment, the switch 352 may include a switch circuitry for selecting a transmission path for a signal transmitted or received through the first antenna 362. The switch 352 may be controlled by a control signal provided from the UWB IC 350. In another embodiment, the switch 352 may be implemented by a filter like a duplexer to split the transmitted or received signal.

In an embodiment, the filter 354 may be electrically connected with the switch 352 and the first antenna 362. The filter 354 may be disposed between the switch 352 and the first antenna 362. In an embodiment, the filter 354 may operate as a filter for removing a noise of a signal transmitted or received through the first antenna 362 and/or for selecting a frequency band of a signal transmitted or received through the first antenna 362. In an embodiment, the filter 354 may include at least one filter according to a reception signal and a transmission signal of the first antenna 362. For example, the filter 354 may include a reception filter to filter a signal received from the first antenna 362, and a transmission filter to filter a signal transmitted through the first antenna 362.

In an embodiment, the filter 356 may be electrically connected with the UWB IC 350 and the second antenna 364. The filter 356 may be disposed between the UWB IC 350 and the second antenna 364. In an embodiment, the filter 356 may operate as a filter for removing a noise of a signal received through the second antenna 364 and/or for selecting a frequency band of a signal received through the second antenna 364.

In an embodiment, the first antenna 362 may operate as an antenna for transmitting or receiving a wireless communication signal, and the second antenna 364 may operate as an antenna for receiving a wireless communication signal. FIG. 3 illustrates the first antenna 362 as an antenna for transmitting and receiving, and the second antenna 364 as an antenna for receiving, but this should not be considered as limiting. For example, the second antenna 364 may also operate as an antenna for transmitting and receiving, similarly to the first antenna 362.

In an embodiment, the wireless communication signal transmitted and received through the first antenna 362 and the second antenna 364 may include an RF signal of a designated frequency band. The RF signal of the designated frequency band may include, for example, a UWB signal of a frequency band having a center frequency of 6 GHz or 8 GHz. The UWB signal may be based on an impulse radio scheme. The UWB signal may include a designated bandwidth, for example, a bandwidth of 499 MHz or a bandwidth of 500 MHz or more. However, a signal transmitted and received through the first antenna 362 and the second antenna 364 is not limited by the above-described example.

Since the first antenna 362 and the second antenna 364 are included in the UWB communication system 302 in an embodiment, the first antenna 362 and/or the second antenna 364 may be referred to as a "UWB antenna."

In an embodiment, the BT/Wi-Fi module 380 may be electrically connected with the processor 320 and the third antenna 382. The BT/Wi-Fi module 380 may support wireless short-range communication such as Bluetooth, Bluetooth low energy (BLE), and Wi-Fi.

In an embodiment, the third antenna 382 may be electrically connected with the BT/Wi-Fi module 380 to transmit or receive an RF signal for short-range communication supported by the BT/Wi-Fi module 380. The third antenna 382 may include various types of antenna structures. For example, the third antenna 382 may include a patch antenna, a dipole antenna, a monopole antenna, a slot antenna, a loop antenna, an inverted-F antenna, a planar inverted-F antenna, and/or an antenna structure of a combination of two or more of the above-mentioned antennas. For example, a radiator of the third antenna 382 may include a part of a housing (for example, a part of a side surface member 440 of FIG. 5) of the electronic device. The part of the housing that is used as the radiator of the third antenna 382 may include a conductive segment which is electrically separated by a nonconductive member. In another example, the third antenna 382 may include a conductive pattern formed on a printed circuit board (for example, a first printed circuit board 571), and the conductive pattern may operate as an antenna radiator.

In an embodiment, the 5G communication system 303 may include a 5G modem 332, an intermediate frequency integrated circuitry (IFIC) 334, a first mmWave antenna module 342, a second mmWave antenna module 344, and a third mmWave antenna module 346.

In an embodiment, the 5G modem 332 may be electrically connected with the processor 320 and the IFIC 334. In an embodiment, the 5G modem 332 may acquire a signal of a baseband based on data provided from the processor 320. The 5G modem 332 may provide the baseband signal to the IFIC 334 when transmitting. In an embodiment, the 5G modem 332 may acquire data which is based on a baseband signal provided from the IFIC 334 when receiving. The 5G modem 332 may provide the acquired data to the processor 320. In an embodiment, at least part of the 5G modem 332 may be integrated with the processor 320. In this case, at least part of functions performed by the 5G modem 332 may be performed by the processor 320.

In an embodiment, the IFIC 334 may be electrically connected with the 5G modem 332, the first mmWave antenna module 342, the second mmWave antenna module 344, and the third mmWave antenna module 346. In an embodiment, when transmitting signals, the IFIC 334 may up-convert a signal of a baseband provided from the 5G modem 332 into a signal of an intermediate frequency band (for example, an IF signal), and may provide the up-converted signal to at least one of the first mmWave antenna module 342, the second mmWave antenna module 344, and/or the third mmWave antenna module. In an embodiment, when receiving signals, the IFIC 334 may down-convert an IF signal provided from at least one of the first mmWave antenna module 342, the second mmWave antenna module 344, and/or the third mmWave antenna module into a signal of a baseband, and may provide the down-converted baseband signal to the 5G modem 332.

In an embodiment, the first mmWave antenna module 342, the second mmWave antenna module 344, and the third mmWave antenna module 346 may include a first array antenna 343, a second array antenna 345, and a third array antenna 347, respectively.

In an embodiment, when transmitting signals, the first mmWave antenna module 342 (for example, the third antenna module 246 of FIG. 2) may up-convert a signal of an intermediate frequency band provided from the IFIC 334 into an RF signal of a designated band, and may transmit the RF signal to the outside through the first array antenna 343. In an embodiment, when receiving signals, the first mmWave antenna module 342, the second mmWave antenna module 344, and the third mmWave antenna module 346 may down-convert a signal received from the first array antenna 343 into a signal having a frequency of an intermediate band, and may provide the signal to the IFIC 334. The explanation of the first mmWave antenna module 342 described above may be applied to the second mmWave antenna module 344 and the third mmWave antenna module 346 in a corresponding way.

In an embodiment, the processor 320 may perform UWB communication with an external device by using the UWB communication system 302. In an embodiment, the processor 320 may perform various functions based on UWB communication. For example, the processor 320 may measure a position of an external device by using UWB communication. In another example, the processor 320 may perform device-to-device data communication (for example, between the electronic device 301 and the external device) by using the UWB communication.

In an embodiment, the processor 320 may perform 5G network communication by using the 5G communication system 303.

When the UWB communication system 302 and the 5G communication system 303 operate simultaneously, communication performance of at least one of UWB communication which uses the UWB communication system 302 and 5G network communication which uses the 5G communication system 303 may be degraded. This may be because a frequency band of an RF signal used in the UWB communication system 302 and a frequency band of an IF signal used in the 5G communication system 303 overlap each other. For example, an IF signal provided from the IFIC 334 of the 5G communication system 303 to an mmWave antenna module (for example, the first mmWave antenna module 342) may have a first designated frequency band, and an RF signal used in the UWB communication system 302 may have a second designated frequency band. The first designated frequency band and the second designated frequency band may overlap at least in part. The first designated frequency band may be, for example, 8 GHz to 11 GHz. The second designated frequency band may be, for example, 7 GHz to 10 GHz. The second designated frequency band may include channel 9 to channel 15 according to the IEEE 802.15.4a UWB communication protocol. When the electronic device 301 performs UWB communication by using at least one channel of channel 9 to channel 15, the second designated frequency band may overlap a frequency band of an IF signal used in 5G communication. An IF signal applied from the IFIC 334 may be induced to the UWB communication system 302. Since the UWB communication system 302 uses a signal of a relatively low power value, it may be difficult to remove a coupling noise occurring from the IF signal.

Figure 4A:
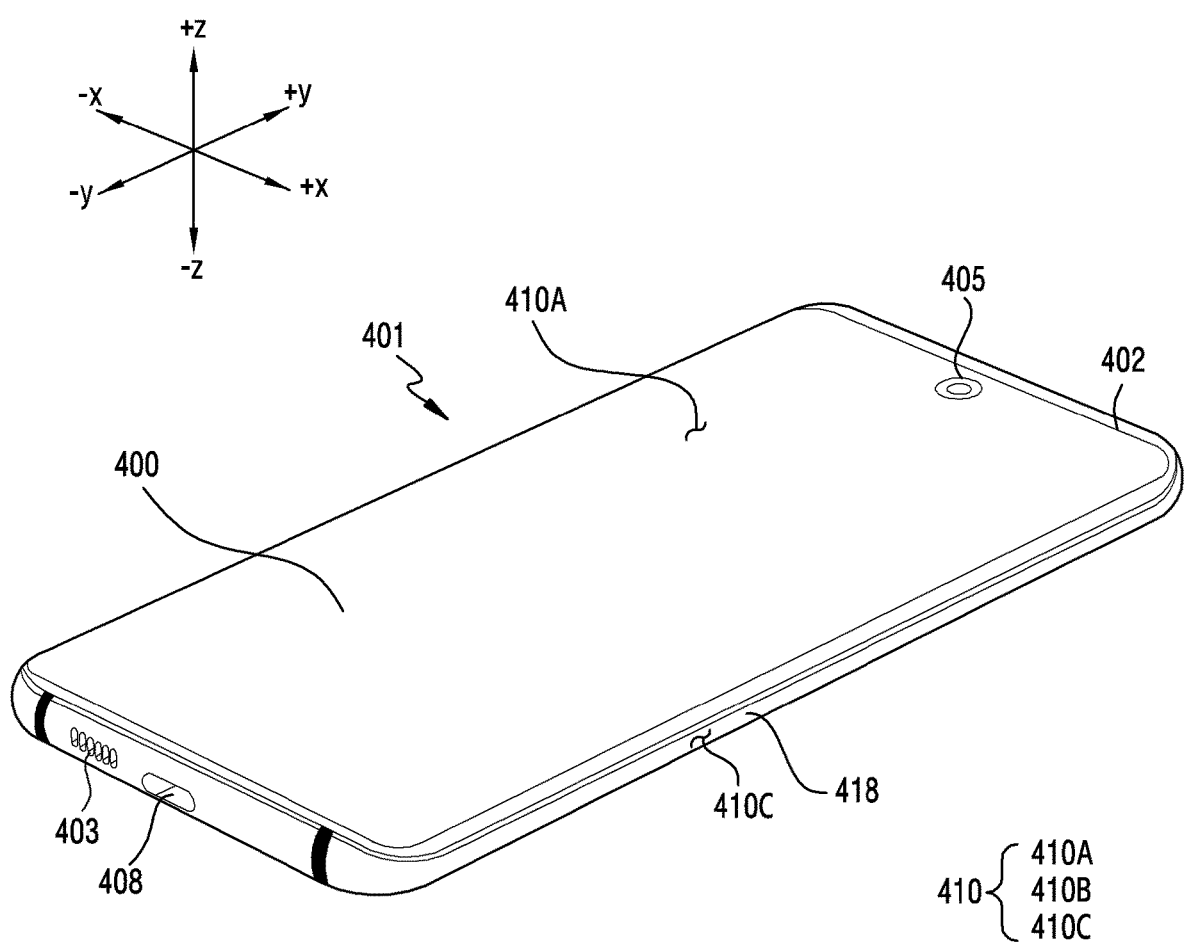
FIG. 4A is a perspective view illustrating a front surface of an electronic device according to an embodiment of the disclosure.

FIG. 4A is a perspective view illustrating a front surface of an electronic device 401 according to an embodiment of the disclosure.

Figure 4B:
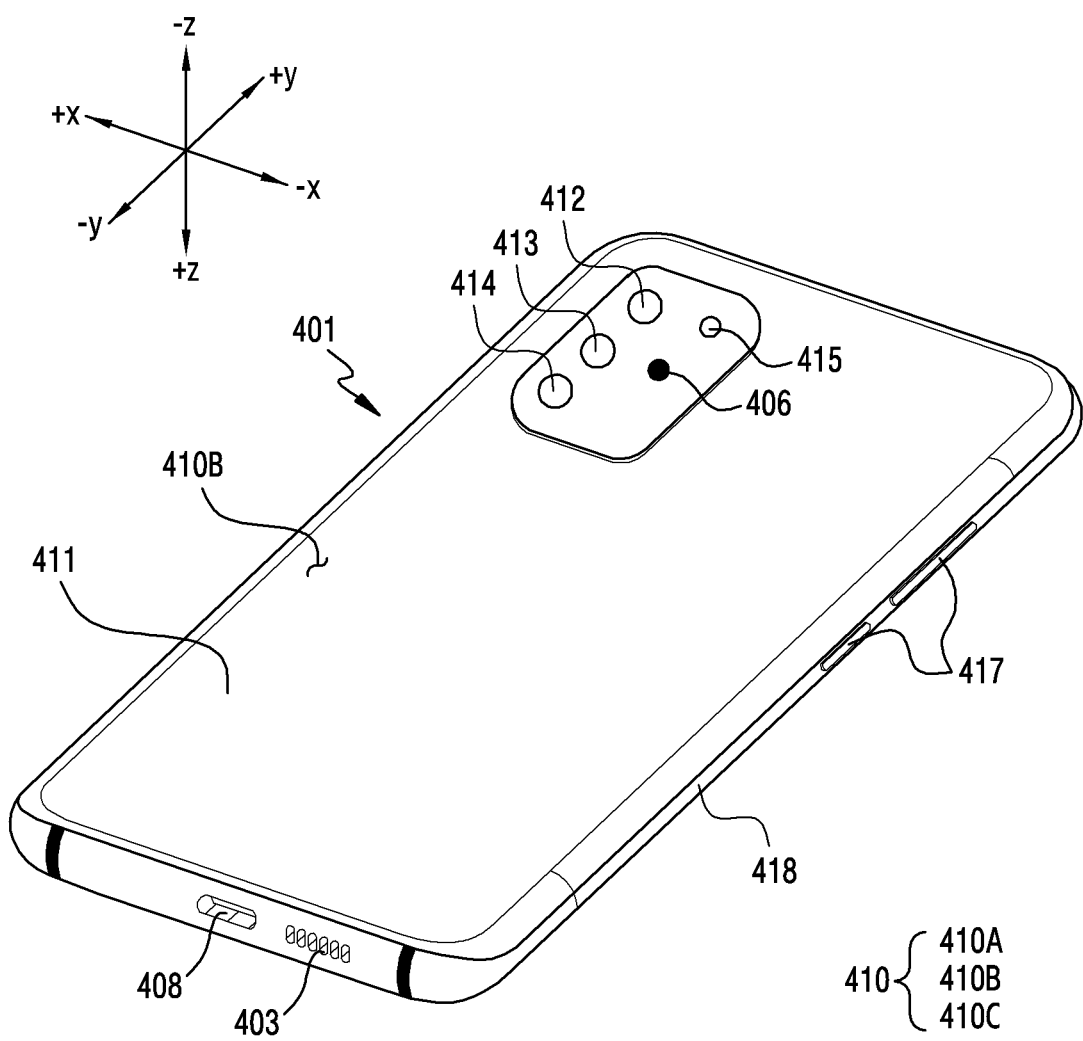
FIG. 4B is a perspective view illustrating a rear surface of the electronic device of FIG. 4A according to an embodiment of the disclosure.

FIG. 4B is a perspective view illustrating a rear surface of the electronic device 401 of FIG. 4A according to an embodiment of the disclosure.

Referring to FIGS. 4A and 4B, the electronic device 401 (for example, the electronic device 301 of FIG. 3) according to an embodiment may include a housing 410 which includes a first surface (or a "front surface") 410A, a second surface (or a "rear surface") 410B, and a side surface (or a "side wall") 410C surrounding a space between the first surface 410A and the second surface 410B. In another embodiment (not shown), the housing 410 may refer to a structure that forms a part of the first surface 410A, the second surface 410B, and the side surface 410C of FIGS. 4A and 4B.

According to an embodiment, the first surface 410A may be formed by a front surface plate 402 having at least part substantially transparent (for example, a glass plate including various coating layers, or a polymer plate). According to an embodiment, the front surface plate 402 may include, on at least one side edge portion, a curved portion bent from the first surface 410A toward a rear surface plate 411 and seamlessly extended.

According to an embodiment, the second surface 410B may be formed by the rear surface plate 411 which is substantially opaque. The rear surface plate 411 may be formed by, for example, coated or colored glass, ceramic, a polymer, metal (for example, aluminum, stainless steel (STS), or magnesium), or a combination of at least two of the above-mentioned materials. According to an embodiment, the rear surface plate 411 may include, on at least one side edge portion, a curved portion bent from the second surface 410B toward the front surface plate 402 and seamlessly extended.

According to an embodiment, the side surface 410C may be formed by a side surface member (or a "bracket") 418 which is coupled with the front surface plate 402 and the rear surface plate 411, and includes metal and/or a polymer. In a certain embodiment, the rear surface plate 411 and the side surface member 418 may be integrally formed with each other, and may include the same material (for example, a metallic material such as aluminum).

According to an embodiment, the electronic device 401 may include at least one of a display 400, an audio module 403 a sensor module (not shown), at least one camera module 405, 412, 413, 414, 415, a flash 406, a key input device 417, and a connector hole 408. In a certain embodiment, the electronic device 401 may omit at least one of the components (for example, the key input device 417) or may additionally include other components. For example, the electronic device 401 may additionally include a sensor module. For example, the sensor module may include at least one of an optical sensor, an ultrasonic sensor, and/or a capacitive sensor. In an embodiment, the sensor module may be disposed on a rear surface of a screen display area of the display 400 and/or a periphery of the display 400. The screen display area may be an area of the display 400 that is seen through the front surface plate 402 of the electronic device 401. In a certain embodiment, the electronic device 401 may further include a light emitting element, and the light emitting element may be disposed adjacent to the display 400 in an area provided by the front surface plate 402. The light emitting element may provide state information of the electronic device 401 in the form of light, for example. In another embodiment, the light emitting element may provide a light source which interlocks with an operation of a first camera module 405. The light emitting element may include, for example, at least one of a light emitting diode (LED), an infrared (IR) LED, and a xenon lamp.

The display 400 may be seen from the outside of the electronic device 401 through a substantial portion of the front surface plate 402, for example. In a certain embodiment, a periphery of the display 400 may be formed substantially the same as a shape of an outside border (for example, a curved surface) of the front surface plate 402 adjacent thereto. In another embodiment (not shown), a gap between an outside border of the display 400 and an outside border of the front surface plate 402 may be formed substantially the same to extend an exposed area of the display 400. In another embodiment (not shown), a recess, a notch, or an opening may be formed on a part of the screen display area of the display 400, and the electronic device may include other electronic components aligned with the recess, the notch, or the opening, for example, the first camera module 405, a proximity sensor or an illuminance sensor which is not illustrated.

In another embodiment (not shown), the electronic device 401 may include, on the rear surface of the screen display area of the display 400, at least one of the at least one camera module 405, 412, 413, 414, 415, a fingerprint sensor, and the flash 406. In still another embodiment (not shown), the display 400 may be coupled with or may be disposed adjacent to a touch sensing circuit, a pressure sensor for measuring an intensity (pressure) of a touch, and/or a digitizer for detecting a stylus pen of a magnetic field scheme.

The audio module 403 may include a microphone hole and/or a speaker hole. The microphone hole may have a microphone disposed therein to acquire an external sound, and in a certain embodiment, the microphone hole may have a plurality of microphones disposed therein to detect a direction of a sound. In a certain embodiment, the speaker hole and the microphone hole may be implemented as one hole (for example, the audio module 403) or a speaker may be included without the speaker hole (for example, a piezo speaker). The speaker hole may include an external speaker hole and/or a receiver hole for communication.

The electronic device 401 may include the sensor module, which is not illustrated, to generate an electric signal or a data value corresponding to an internal operation state or an external environment state. The sensor module may further include, for example, a proximity sensor disposed on the first surface 410A of the housing 410, a fingerprint sensor integrated into or disposed adjacent to the display 400, and/or a biometric sensor (for example, an HRM sensor) disposed on the second surface 410B of the housing 410. The electronic device 401 may further include a sensor module (not shown), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

A first camera module 405 of the at least one camera modules 405, 412, 413, 414, 415 may be disposed on the first surface 410A of the electronic device 401, and second camera modules 412, 413, 414, 415 and the flash 406 may be disposed on the second surface 410B of the electronic device 401. The at least one camera modules 405, 412, 413, 414, 415 described above may include one or a plurality of lenses, an image sensor, and/or an image signal processor. The flash 406 may include, for example, a light emitting diode or a xenon lamp. In a certain embodiment, two or more lenses (an infrared camera, a wide-angle lens and a telephoto lens), or image sensors may be disposed on one surface of the electronic device 401.

The key input device 417 may be disposed on the side surface 410C of the housing 410. In another embodiment, the electronic device 401 may not include a part or an entirety of the key input device 417 mentioned above, and the key input device 117 that is not included may be implemented on the display 400 in other forms like a soft key. In a certain embodiment, the key input device may include at least part of the fingerprint sensor disposed on the second surface 410B of the housing 410.

The connector hole 408 may accommodate a connector for transmitting and receiving power and/or data to and from an external electronic device, and/or a connector for transmitting and receiving an audio signal to and from an external electronic device. For example, the connector hole 408 may include a USB connector or an earphone jack. In an embodiment, the USB connector and the earphone jack may be implemented by one hole (for example, 408 of FIGS. 4A, 4B), and according to another embodiment (not shown), the electronic device 401 may transmit and receive power and/or data to and from an external electronic device (for example, the electronic device 102, 104 of FIG. 1), or may transmit and receive an audio signal without a separate connector hole.

Figure 5:
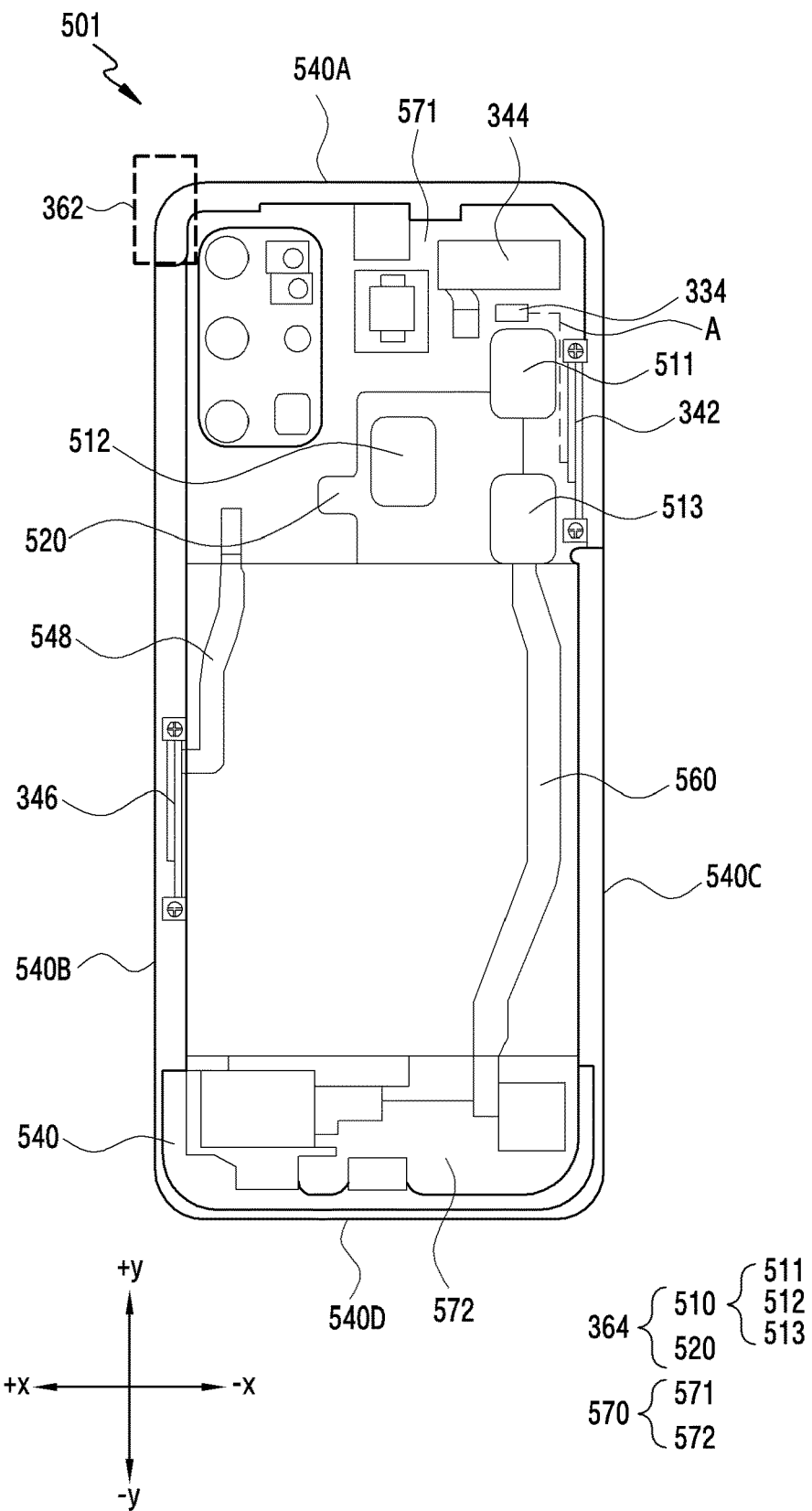
FIG. 5 is a view illustrating an interior of an electronic device according to an embodiment of the disclosure.

FIG. 5 illustrates an interior of an electronic device according to an embodiment of the disclosure.

Regarding components that are substantially the same as or similar to the above-described components in FIG. 5, the same reference numerals may be used, and a redundant explanation is omitted.

Referring to FIG. 5, the electronic device 501 (for example, the electronic device 401 of FIG. 4A) according to an embodiment may include a side surface member 540 (for example, the side surface member 418 of FIG. 4A), at least one printed circuit board 570, and a connection member 560.

In an embodiment, the side surface member 540 may include a first periphery 540A, a second periphery 540B, a third periphery 540C, and a fourth periphery 540D. The side surface member 540 may have a substantially rectangular shape when viewed from above (for example, when viewed in a z-axis direction of FIG. 4A). In an embodiment, the second periphery 540B may be extended from one end of the first periphery 540A in a substantially perpendicular direction to the first periphery 540A. The third periphery 540C may be extended from the other end of the first periphery 540A in a substantially perpendicular direction to the first periphery 540A. The fourth periphery 540D may be parallel to the first periphery 540A, and may be extended from one end of the second periphery 540b to one end of the third periphery 540C.

In an embodiment, the side surface member 540 may form at least part of a side surface (for example, the side surface 410C of FIG. 4A) of the electronic device 501. In an embodiment, at least part of the side surface member 540 may be formed with a conductive material (for example, metal). For example, the side surface member 540 may include at least one conductive portion and/or at least one nonconductive portion that insulates the at least one conductive portion. The at least one conductive portion of the above-described side surface member 540 may operate as an antenna radiator to transmit and/or receive an RF signal of a designated frequency band. For example, an antenna radiator of a first antenna 362 may be formed on a part of the side surface member 540. However, this should not be considered as limiting, and the first antenna 362 may include, for example, an antenna radiator which is formed by laser direct structuring (LDS). In this case, the first antenna 362 may be directly formed on a first printed circuit board 571, or may be fabricated in the form of a separate module and may be disposed on the first printed circuit board 571 or the side surface member 540. In another example, the first antenna 362 may be integrated into a second antenna 364. In this case, the second antenna 364 may operate as an antenna for transmitting or receiving an RF signal of a designated band, like the first antenna 362.

In an embodiment, the side surface member 540 may be extended from a side surface of the electronic device 501 toward an inside to provide a space to have various components disposed in the electronic device 501. For example, the at least one printed circuit board 570 may be disposed on one surface of the side surface member 540. In an embodiment, on the side surface member 540, a portion that forms a side surface of the electronic device 501 and a portion that is extended to an inside of the electronic device 501 may be integrally formed with each other, but this should not be considered as limiting. In another embodiment, a portion of the side surface member 540 that forms a side surface of the electronic device 501, and a portion of the side surface member 540 that is extended to the inside of the electronic device 501 may be separately formed.

In an embodiment, the at least one printed circuit board 570 may include the first printed circuit board 571 and/or a second printed circuit board 572. In an embodiment, the first printed circuit board 571 and the second printed circuit board 572 may be electrically connected through the connection member 560. The above-described connection member 560 may include, for example, at least one of a flexible printed circuit board (FPCB), a coaxial cable, a board to board (B to B) connector, but is not limited thereto. A structure of the at least one printed circuit board 570 is not limited to the embodiment illustrated on the drawing, and according to another embodiment, the at least one printed circuit board 570 may be configured as one printed circuit board.

In an embodiment, a plurality of components may be disposed on the at least one printed circuit board 570. For example, an IFIC 334, a second mmWave antenna module 344, and the second antenna 364 may be disposed on the first printed circuit board 571. In another example, a processor (for example, 320 of FIG. 3), a 5G modem (332 of FIG. 3), and a BT/Wi-Fi module (380 of FIG. 3) may be disposed on the at least one printed circuit board 570. In an embodiment, components disposed on the at least one printed circuit board 570 may be operatively coupled with one another through an electrical path provided by the at least one printed circuit board 570. The components disposed on the at least one printed circuit board 570 are not limited to the illustrated example, and at least one of the components illustrated in FIGS. 1 to 3 may be disposed.

In an embodiment, a first mmWave antenna module 342 may be disposed on the first printed circuit board 371 or the side surface member 540. The first mmWave antenna module 342 may be disposed such that an array antenna (for example, the first array antenna 343 of FIG. 3) of the first mmWave antenna module 342 faces the third periphery 540C of the side surface member 540. The first mmWave antenna module 342 may be electrically connected with the IFIC 334 through an electrical path provided by the first printed circuit board 571. For example, the first mmWave antenna module 342 may be electrically connected with the IFIC 334 through a first path A of the first printed circuit board 571. The first path A may be formed by a conductive wire. The first path A may detour from the IFIC 334 to the second antenna 364, and may be extended to the first mmWave antenna module 342. However, the first path A is not limited to the illustrated example. For example, since the first printed circuit board 571 includes a plurality of layers, at least part of the first path A may be formed inside the first printed circuit board 571. Accordingly, when the electronic device 501 is viewed from above (for example, when the electronic device 501 is viewed from the z axis of FIG. 4A), at least part of the first path A may overlap the second antenna 364. The explanation of the first path A described above may be applied to an electrical path provided to connect the IFIC 334 and the second mmWave antenna module 344 and/or a third mmWave antenna module 346 in a corresponding way.

In an embodiment, the second mmWave antenna module 344 may be disposed on the first printed circuit board 571. The second mmWave antenna module 344 may be electrically connected with the IFIC 334. The second mmWave antenna module 344 may be disposed such that an array antenna (for example, the second array antenna 345 of FIG. 3) of the second mmWave antenna module 344 faces a rear surface (for example, the rear surface 410B of FIG. 4B) of the electronic device 501.

In an embodiment, the third mmWave antenna module 346 may be disposed on the side surface member 540. The third mmWave antenna module 346 may be disposed such that an array antenna (for example, the third array antenna 347 of FIG. 3) of the third mmWave antenna module 346 faces the second periphery 540B of the side surface member 540. The third mmWave antenna module 346 may be connected with the first printed circuit board 571 through a connection member 548, and may be electrically connected with the IFIC 334 through an electrical path provided by the first printed circuit board 571. The connection member 548 may include a flexible printed circuit board (FPCB).

In an embodiment, the second antenna 364 may be disposed on the first printed circuit board 571. In an embodiment, the second antenna 364 may include at least one conductive patch 510 and a flexible circuit board 520. The at least one conductive patch 510 may be formed on the flexible circuit board 520. In an embodiment, the flexible circuit board 520 may include a feeding line for feeding the at least one conductive patch 510, a ground, and a dielectric disposed between the at least one conductive patch 510 and the ground. In an embodiment, the second antenna 364 may operate as a patch antenna (or a microstrip antenna) in which the at least one conductive patch 510, a dielectric layer, and the ground are stacked. In an embodiment, the at least one conductive patch 510 may be fed from a UWB IC (350 of FIG. 3) to transmit or receive an RF signal of a designated band.

In an embodiment, the at least one conductive patch 510 may include a first conductive patch 511, a second conductive patch 512, and a third conductive patch 510. The first conductive patch 511, the second conductive patch 512, and the third conductive patch 513 may be spaced apart from one another on the flexible circuit board 520.

In an embodiment, the second antenna 364 may be closer to the first mmWave antenna module 342 than to the second mmWave antenna module 344 and the third mmWave antenna module 346. The first path A which electrically connects the first mmWave antenna module 342 and the IFIC 334 may be adjacent to the second antenna 364.

An IF signal provided from the IFIC 334 to the first mmWave antenna module 342, the second mmWave antenna module 344 or the third mmWave antenna module 346 may be induced to the second antenna 364. Due to the signal induced to the second antenna 364, communication performance using the second antenna 364 may be degraded. Since the first mmWave antenna module 342 is closest to the second antenna 364, an IF signal provided to the first mmWave antenna module 342 through the first path A may influence the second antenna 364 most greatly.

In another embodiment, a housing (for example, the housing 410 of FIGS. 4A and 4B) of the electronic device 501 including the side surface member 540 may include a foldable or rollable housing that may be folded or bent on at least part. In this case, according to a state in which the housing is folded or bent, a size of the electronic device 501 may vary and a distance between the second antenna 364 and the first mmWave antenna module 342 may also vary. A processor (for example, the processor 320 of FIG. 3) of the electronic device 501 may detect a distance between the second antenna 364 and the first mmWave antenna module 342 that corresponds to the state in which the housing is folded or bent. The processor of the electronic device 501 may identify whether the distance exceeds a designated value. The processor of the electronic device 501 may not perform operations illustrated in FIGS. 7 to 9 when the distance between the first mmWave antenna module 342 and the second antenna 364 exceeds the designated value. The processor of the electronic device 501 may perform operations illustrated in FIGS. 7 to 9 when the distance between the first mmWave antenna module 342 and the second antenna 364 is less than or equal to the designated value. This is because, as the distance between the first mmWave antenna module 342 and the second antenna 364 increases, communication interference therebetween is reduced. The above-described explanation has been provided with reference to the first mmWave antenna module 342, but may be applied to the second mmWave antenna module 344 or the third mmWave antenna module 346 in the same, similar or corresponding way.

Figure 6:
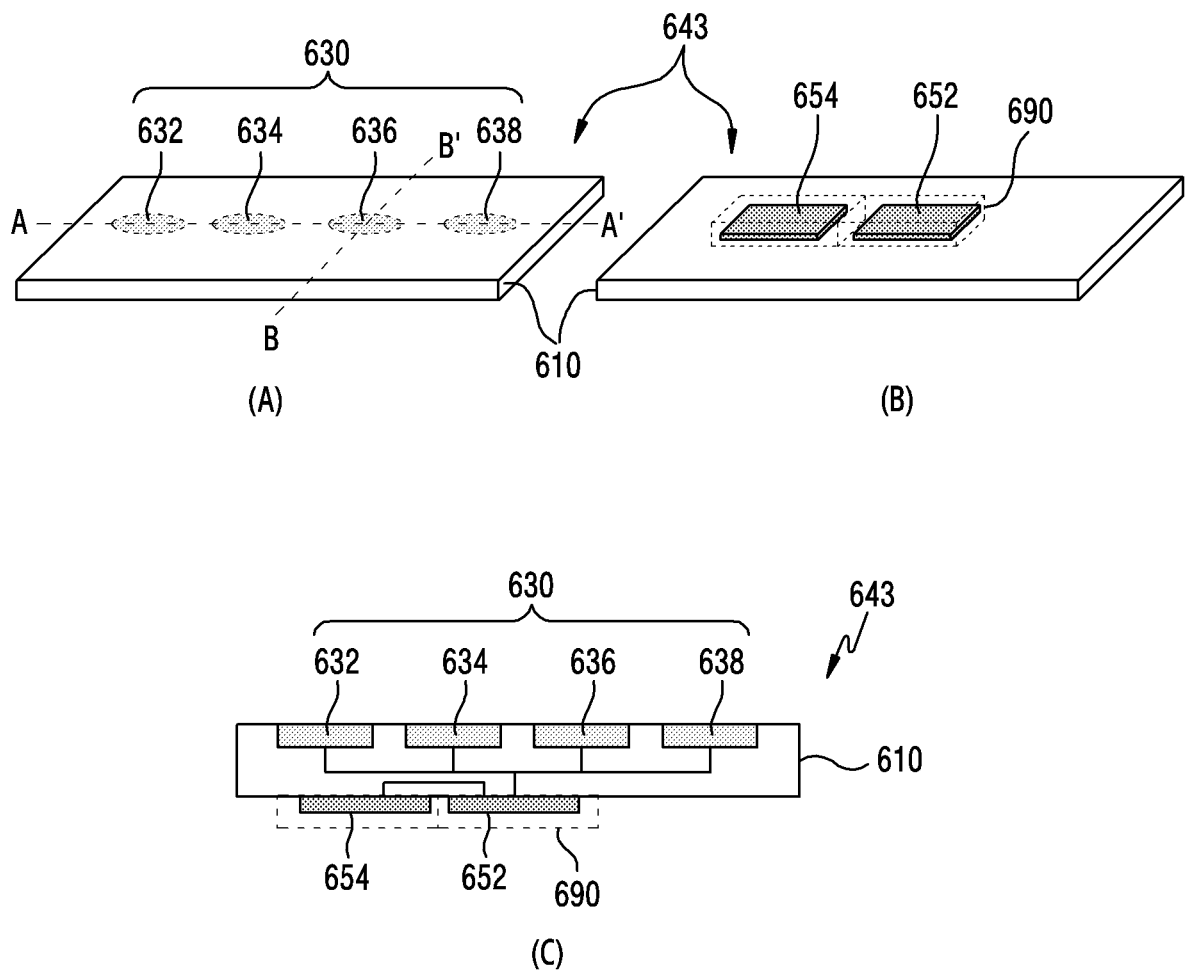
FIG. 6 is a view illustrating a structure of an mmWave antenna module according to an embodiment of the disclosure.

FIG. 6 illustrates a structure of an mmWave antenna module 643 according to an embodiment of the disclosure.

Part (A) of FIG. 6 is a perspective view of the mmWave antenna module 643 as viewed from one side, and Part (B) of FIG. 6 is a perspective view of the mmWave antenna module 643 as viewed from the other side. Part (C) of FIG. 6 is a cross-sectional view of the mmWave antenna module 643 taken on line A-A'.

Referring to FIG. 6, in an embodiment, the mmWave antenna module 643 (for example, the first mmWave antenna module 342, the second mmWave antenna module 344, or the third mmWave antenna module 346 of FIG. 3) may include a printed circuit board 610, an array antenna 630 (for example, the first array antenna 343, the second array antenna 345, or the third array antenna 347 of FIG. 3), a radio frequency integrate circuit (RFIC) 652, a power manage integrate circuit (PMIC) 654, and a module interface (not shown). Selectively, the mmWave antenna module 643 may further include a shield member 690. In other embodiments, at least one of the above-mentioned components may be omitted and at least two of the components may be integrally formed.

According to an embodiment, the printed circuit board 610 may include a plurality of conductive layers and a plurality of nonconductive layers which are stacked alternately with the conductive layers. The printed circuit board 610 may provide an electrical connection among various electronic components which are disposed on the printed circuit board 610 and/or an outside, by using wires and conductive vias formed on the conductive layer.

According to an embodiment, the array antenna 630 (for example, the antenna 248 of FIG. 2) may include a plurality of antenna elements 632, 634, 636, or 638 which are disposed to form a directional beam. The antenna elements may be formed on a first surface of the printed circuit board 610 as shown in the drawing. According to another embodiment, the array antenna 630 may be formed inside the printed circuit board 610. According to embodiments, the array antenna 630 may include a plurality of array antennas of the same or different shapes or types (for example, a dipole array antenna and/or a patch array antenna).

According to an embodiment, the RFIC 652 (for example, the third RFIC 226 of FIG. 2) may be disposed on another area of the printed circuit board 610 (for example, a second surface which is opposite to the first surface), which is spaced apart from the array antenna. The RFIC may be configured to process a signal of a selected frequency band, which is transmitted/received through the array antenna 630. According to an embodiment, when transmitting signals, the RFIC 652 may convert a baseband signal acquired from a communication processor (not shown) into an RF signal of a designated band. When receiving signals, the RFIC 652 may convert an RF signal received through the array antenna 630 into a baseband signal, and may transmit the baseband signal to the communication processor.

According to another embodiment, when transmitting signals, the RFIC 652 may up-convert an IF signal (for example, about 9 GHz to about 11 GHz) acquired from an intermediate frequency integrate circuit (IFIC) (for example, the fourth RFIC 228 of FIG. 2) into an RF signal of a selected band. When receiving signals, the RFIC 652 may down-convert an RF signal acquired through the array antenna 630 into an IF signal, and may transmit the IF signal to the IFIC.

According to an embodiment, the PMIC 654 may be disposed on another area (for example, the second surface) of the printed circuit board 610, which is spaced apart from the array antenna. The PMIC may receive power from a main PCB (not shown), and may provide necessary power to various components (for example, the RFIC 652) on the antenna module.

According to an embodiment, the shield member 690 may be disposed on a part (for example, the second surface) of the printed circuit board 610 so as to electromagnetically shield at least one of the RFIC 652 or the PMIC 654. According to an embodiment, the shield member 690 may include a shield can.

In various embodiments, the mmWave antenna module 643 may be electrically connected with another printed circuit board (for example, a major circuit board) through the module interface. The module interface may include a connection member, for example, a coaxial cable connector, a board-to-board connector, an interposer, or a flexible printed circuit board (FPCB). Through the connection member, the RFIC 652 and/or the PMIC 654 of the antenna module may be electrically connected with the printed circuit board.

Figure 7:
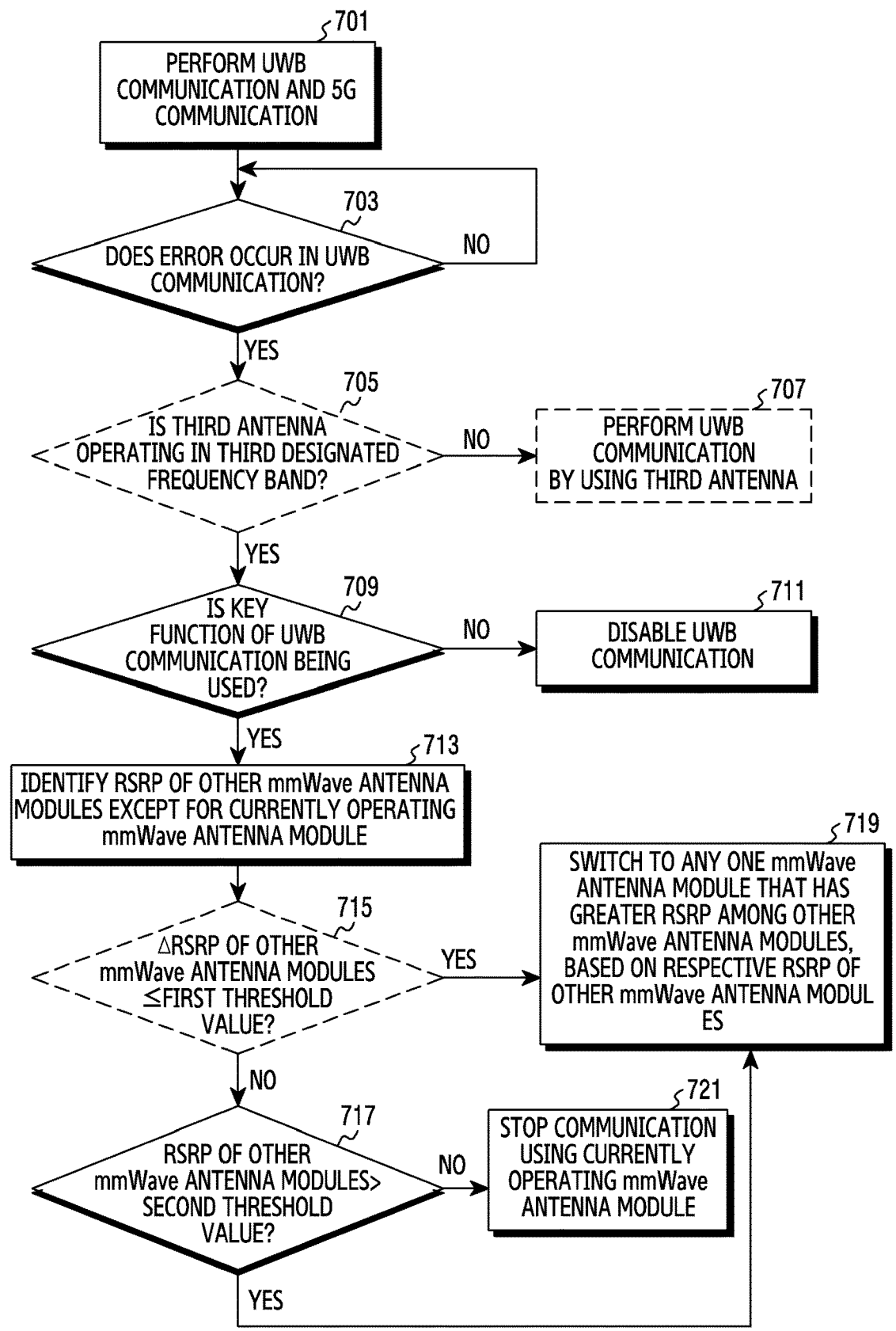
FIG. 7 is a flowchart illustrating a method for an electronic device to perform wireless communication according to an embodiment of the disclosure.

FIG. 7 is a flowchart illustrating a method for an electronic device to perform wireless communication according to an embodiment of the disclosure.

Operations of FIG. 7 may be performed by the electronic device 301 and the processor 320 of the electronic device 301 of FIG. 3.

Operations displayed by dashed lines in FIG. 7 among the operations of FIG. 7 may be omitted.

Referring to FIG. 7, in operation 701, the electronic device 301 according to an embodiment may perform UWB communication and 5G communication. For example, the processor 320 may perform UWB communication by using the UWB communication system 302, and may perform 5G communication by using the 5G communication system 303. For example, when performing the 5G communication, the processor 320 may control the IFIC 334 to provide a signal of the first frequency band (for example, an IF signal) to the first mmWave antenna module 342. For example, when performing the UWB communication, the processor 320 may control the UWB IC 350 to acquire a signal of the second frequency band overlapping the first frequency band in part through a UWB antenna (for example, the first antenna 362 and/or the second antenna 364).

In operation 703, the electronic device 301 according to an embodiment may determine whether an error occurs in the UWB communication. For example, while performing the UWB communication and the 5G communication, the processor 320 may determine whether an error of data occurs in a process of modulating or demodulating a signal transmitted or received in the UWB communication system 302. A method in which the processor 320 determines an error of data based on a signal received by using the UWB communication system 302 may use, for example, a cyclic redundancy check (CRC) technique, but is not limited thereto. When an error of data based on an RF signal received by using the UWB communication system 302 (for example, the second antenna 364), or an error rate of data is larger than an acceptable threshold value, the processor 320 may determine that an error occurs in the UWB communication. When the processor 320 determines that an error occurs in the UWB communication in operation 703, the processor may perform operation 705. When the processor 320 determines that an error does not occur in the UWB communication in operation 703, the processor may perform operation 703 again.

In operation 705, the electronic device 301 may determine whether the third antenna 382 is operating in a third designated frequency band. For example, the processor 320 may determine whether wireless communication is performed by using an RF signal of the third designated band through the third antenna 382 connected with the BT/Wi-Fi module 380. The third designated band may be a band that does not overlap a frequency band (for example, 8 GHz to 11 GHz) of an IF signal used in the 5G communication system 303. The third designated band may include, for example, 6 GHz. Communication performed by using the third antenna 382 may be distinguished from communication performed by using the UWB communication system 302 and the 5G communication system 303. For example, communication performed by using the third antenna 382 may include wireless local area network (LAN) communication such as Wi-Fi.

When it is determined that the electronic device 301 is using Wi-Fi in the third designated frequency band in operation 705, the electronic device 301 may perform operation 709, and, when it is not determined otherwise, the electronic device 301 may perform operation 707.

In operation 707, the electronic device 301 may perform UWB communication by using the third antenna. For example, the processor 320 may perform UWB communication by using the third antenna 382. For example, the processor 320 may perform UWB communication using the third antenna 382 by disabling a UWB antenna (for example, the first antenna 362 and/or the second antenna 364) which is in an enabled state, and frequency hopping to the third designated frequency band. The processor 320 may control the UWB IC 350 to receive or transmit an RF signal having the third designated frequency band through the third antenna 382.

Operations 705 and 707 have been described with reference to the BT/Wi-Fi module 380 and the third antenna 382, but are not limited thereto. For example, the same may be applied to other communication systems (or other antennas) that are not included in the UWB communication system 302 and the 5G communication system 303 and use a frequency band not overlapping a frequency band of an IF signal (for example, the first frequency band) used in the 5G communication system 303. In another example, the same may be applied to other antennas that do not overlap the frequency band of the IF signal used in the 5G communication system 303 and are not adjacent to the first mmWave antenna module 342, the second mmWave antenna module 344, and the third mmWave antenna module 345.

In an embodiment, operations 705 and 707 may be omitted. In this case, operation 709 may be performed after operation 703.

In operation 709, the electronic device 301 may determine whether a key function of the UWB communication is being used.

For example, when the processor 320 performs an operation of detecting a position of an external device by using the UWB communication system 302, the processor 320 may determine that a key function of the UWB communication is being used, and, when the processor 320 performs a different operation other than the operation of detecting the position of the external device, the processor 320 may determine that the key function of the UWB communication is not being used. The operation of detecting the position of the external device may include an operation of measuring a distance to the external device, based on an RF signal transmitted or received from the external device (or to the external device) by using the UWB communication system 302. The operation of detecting the position of the external device may include an operation of detecting an angle of arrival (AoA) of the RF signal received from the external device by using the UWB communication system 302. The operation of detecting the position of the external device may include an operation of determining the position of the external device based on the distance to the external device and the AoA. The different operation may include an operation of transmitting and receiving data having nothing to do with detection of the position to and from the external device by using the UWB communication system 302.

In another example, when an application related to the operation of detecting the position of the external device is being executed, the processor 320 may determine that the key function of the UWB communication is being used. The processor 320 may identify whether the application related to detection of the position of the external device is being executed. The processor 320 may determine whether the key function of the UWB communication is being used, based on the identification.

In another example, when the application is being executed in the foreground, the processor 320 may determine that the key function of the UWB communication is being used, and, when the application is being executed in the background, the processor 320 may determine that the key function of the UWB communication is not being used. The processor 320 may identify whether the application is being executed in the foreground or the background. The processor 320 may determine whether the key function of the UWB communication is being used, based on the identification.

The application being executed in the foreground may mean that the application is being executed in a state where a user interface of the application is displayed on a display (for example, the display 400 of FIG. 4A) of the electronic device 301. The application being executed in the background may mean that the application is being executed in a state where the user interface of the application is not displayed on the display of the electronic device 301.

In another example, the processor 320 may determine whether the key function of the UWB communication is being used, based on a pre-set priority flag. For example, it may be assumed that a first operation (for example, the above-described position detection operation) using the UWB communication is assigned a higher priority flag than an operation of using 5G communication, and a second operation (for example, an operation of transmitting data, which is not related to the above-described position detection) using the UWB communication is assigned a lower priority flag than the operation of using the 5G communication. In this case, the processor 320 may determine that the key function of the UWB communication is being used while the first operation is being performed, and may determine that the key function of the UWB communication is not being used while the second operation is being performed.

When it is determined that the key function of the UWB communication is being used in operation 709, the electronic device 301 may perform operation 713, and, when it is determined otherwise, the electronic device 301 may perform operation 711.

In operation 711, the electronic device 301 may disable the UWB communication system. For example, the processor 320 may change the UWB communication system 302 from an enabled state to a disabled state. The enabled state of the UWB communication system 302 may refer to a state in which wireless communication with an external device is established by using the UWB communication system 302. The disabled state of the UWB communication system 302 may refer to a state in which wireless communication with the external device by using the UWB communication system 302 is disconnected. The disabled state of the UWB communication system 302 may refer to a state in which power and/or a signal necessary for operating at least one (for example, the first antenna 362 and/or the second antenna 364) of the components include in the UWB communication system 302 is not supplied, or a state in which at least some of the functions of the UWB communication system 302 is limited. The explanation of the disabled state described above may be applied to other components in the same or similar way.

In operation 713, when it is determined that the key function of the UWB communication is being used, the electronic device 301 may identify reference signal received power (RSRP) of the other mmWave antenna modules except for the currently operating mmWave antenna module. For example, when the first mmWave antenna module 342 is operating, the processor 320 may perform a beam sweeping operation toward the second mmWave antenna module 344 and the third mmWave antenna module 346, and may detect RSRP regarding the second mmWave antenna module 344 and the third mmWave antenna module 346, respectively. For example, the processor 320 may detect a first RSRP regarding the second mmWave antenna module 344 and a second RSRP regarding the third mmWave antenna module. The above-described explanation may be equally applied even when the currently operating mmWave antenna module is the second mmWave antenna module 344 and even when the currently operating mmWave antenna module is the third mmWave antenna module 346. For example, in operation 713, when the second mmWave antenna module 344 is operating, the processor 320 may detect RSRP regarding the first mmWave antenna module 342 and the third mmWave antenna module 346, respectively.

In operation 715, the electronic device 301 may determine whether a difference in the RSRP between the other mmWave antenna modules is less than or equal to a pre-set first threshold value. For example, the processor 320 may determine whether a difference between the first RSRP of the second mmWave antenna module 344 and the second RSRP of the third mmWave antenna module 346, which are detected in operation 713, is less than or equal to the first threshold value. The first threshold value may be, for example, 5 dB, but is not limited thereto.

In operation 715, when it is determined that the difference in the RSRP is less than or equal to the threshold value, the electronic device 301 may perform operation 719, and when it is determined otherwise, the electronic device 301 may perform operation 717.

In an embodiment, operation 715 may be omitted. When operation 715 is omitted, the electronic device 301 may perform operation 717 after operation 713.

In operation 717, the electronic device 301 may determine whether the RSRP of the other mmWave antenna modules exceeds a pre-set second threshold value. For example, the processor 320 may determine whether the first RSRP of the second mmWave antenna module 344 and the second RSRP of the third mmWave antenna module 346 exceed the second threshold value. The second threshold value may be −115 dB, but is not limited thereto. When it is determined that the first RSRP and the second RSRP exceed the second threshold value, the processor 320 may perform operation 719, and, when it is determined otherwise, the processor 320 may perform operation 721.

In operation 719, the electronic device 301 may switch to any one mmWave antenna module that has greater RSRP among the other modules, based on the respective RSRPs of the other mmWave antenna modules. For example, when it is determined that the difference between the first RSRP of the second mmWave antenna module 344 and the second RSRP of the third mmWave antenna module 346 is less than or equal to the first threshold value in operation 715, the processor 320 may switch to any one mmWave antenna module that has a greater RSRP among the second mmWave antenna module 344 and the third mmWave antenna module 346. For example, when it is determined that the first RSRP of the second mmWave antenna module 344 and the second RSRP of the third mmWave antenna module 346 exceed the second threshold value in operation 717, the processor 320 may switch to any one mmWave antenna module that has a greater RSRP among the second mmWave antenna module 344 and the third mmWave antenna module 346. For example, when the first RSRP of the second mmWave antenna module 344 is greater than the second RSRP of the third mmWave antenna module 346, the processor 320 may disable the currently operating first mmWave antenna module 342, and may enable the second mmWave antenna module 344. In this case, the processor 320 may stop communication using the first mmWave antenna module 342, and may continue performing the 5G network communication by using the second mmWave antenna module 344.

In operation 721, the electronic device 301 may stop communication using the currently operating mmWave antenna module. For example, when it is determined that the first RSRP of the second mmWave antenna module 344 and the second RSRP of the third mmWave antenna module 346 do not exceed the second threshold value in operation 717, the processor 320 may stop communication using the currently operating first mmWave antenna module 342. In this case, the processor 320 may disable the first mmWave antenna module 342, and may perform wireless communication based on a communication network (for example, LTE) different from the 5G communication network, or may perform 5G network communication by using other frequency bands (for example, FR1, frequency range 1) that do not overlap the UWB communication system 302.

As described above, the processor 320 of the electronic device 301 according to an embodiment may disable the UWB antenna or may stop the communication using the first mmWave antenna module 342 according to whether a designated condition related to the UWB antenna is satisfied. For example, when it is determined that an error occurs in the UWB communication in operation 703 and it is identified that the third antenna 382 is not operating in the third designated frequency band in operation 705, the processor 320 may disable the UWB antenna and may perform UWB communication by using the third antenna 382 as in operation 707. In another example, when it is determined that an error occurs in the UWB communication in operation 703 and it is determined that the key function of the UWB communication is not being used in operation 709, the processor 320 may disable the UWB antenna and may stop the UWB communication as in operation 711. In another example, when it is determined that an error occurs in the UWB communication in operation 703 and it is determined that the key function of the UWB communication is being used in operation 709, the processor may stop the communication using the first mmWave antenna module 342 and may perform communication by using the second mmWave antenna module 344 or the third mmWave antenna module 346 as in operation 719. In another example, when it is determined that an error occurs in the UWB communication in operation 703 and it is determined that the key function of the UWB communication is being used in operation 709, the processor may stop the communication using the first mmWave antenna module 342 as in operation 721. In this case, the processor 320 may perform cellular communication by using a different communication method (for example, LTE) other than the 5G communication system 303, or may perform 5G network communication by using a frequency band (for example, FR1) that does not overlap the UWB communication system 302.

According to an embodiment, an electronic device (for example, the electronic device 301 of FIG. 3) may include: a first mmWave antenna module (for example, the first mmWave antenna module 342 of FIG. 3) including a first array antenna (for example, the first array antenna 343 of FIG. 3); an intermediate frequency (IF) circuit (for example, the IFIC 334 of FIG. 3) electrically connected with the first mmWave antenna module through a first path (for example, the first path A of FIG. 5); an ultra-wide band (UWB) antenna (for example, the first antenna 362 and/or the second antenna 364 of FIG. 3) disposed adjacent to the first path; a UWB circuit (for example, the UWB IC 350 of FIG. 3) electrically connected with the UWB antenna; and at least one processor (for example, the processor 320 of FIG. 3) electrically connected with the IF circuit and the UWB circuit, and the at least one processor may: control the IF circuit to provide a signal of a first frequency band to the first mmWave antenna module (for example, an operation of performing 5G communication in operation 701 of FIG. 7); control the UWB circuit to acquire a signal of a second frequency band overlapping the first frequency band in part through the UWB antenna (for example, an operation of performing UWB communication in operation 701 of FIG. 7); and disable the UWB antenna (for example, operation 711 of FIG. 7) or stop communication using the first mmWave antenna module (for example, operation 719 or 721 of FIG. 7) according to whether a designated condition related to the UWB antenna is satisfied.

In an embodiment, the at least one processor may: identify whether an error of data which is based on a signal acquired through the UWB antenna occurs (for example, operation 703 of FIG. 7); in response to identifying that the error occurs, identify whether an application related to detection of a position of an external device is being executed (for example, operation 709 of FIG. 7); and, in response to identifying that the application is not being executed, disable the UWB antenna (for example, operation 711 of FIG. 7).

In an embodiment, the electronic device may further include: a second mmWave antenna module (for example, the second mmWave antenna module 344 of FIG. 3) including a second array antenna (for example, the second array antenna 345 of FIG. 3) and electrically connected with the IF circuit; and a third mmWave antenna module (for example, the third mmWave antenna module 346 of FIG. 3) including a third array antenna (for example, the third array antenna 347 of FIG. 3) and electrically connected with the IF circuit, and the least one processor may, in response to identifying that the application is being executed, detect a first reference signal received power (RSRP) which is based on a signal acquired by using the second mmWave antenna module, and a second RSRP which is based on a signal acquired by using the third mmWave antenna module (for example, operation 713 of FIG. 7).

In an embodiment, the at least one processor may: identify whether the first RSRP and the second RSRP exceed a threshold value (for example, operation 717 of FIG. 7); when the first RSRP and the second RSRP exceed the threshold value, disable the first mmWave antenna module and enable any one of the second mmWave antenna module and the third mmWave antenna module that has a great RSRP (for example, operation 719 of FIG. 7); and, when the first RSRP and the second RSRP are less than or equal to the threshold value, stop communication using the first mmWave antenna module (for example, operation 721 of FIG. 7).

According to an embodiment, the electronic device may further include another antenna (for example, the third antenna 382 of FIG. 3) which is distinguished from the first array antenna and the UWB antenna, and is electrically connected with the at least one processor, and the at least one processor may: identify whether an error rate of data which is based on a signal acquired through the UWB antenna exceeds a threshold value (for example, operation 703 of FIG. 7); in response to identifying that the error rate exceeds the threshold value, identify whether the other antenna is operating (for example, operation 705 of FIG. 7); when the other antenna is not operating, control the UWB circuit to acquire a signal of a third frequency band which does not overlap the first frequency band through the other antenna (for example, operation 707 of FIG. 7).

In an embodiment, the at least one processor may: when the other antenna is operating (for example, operation 705 of FIG. 7), identify whether an application related to detection of a position of an external device is being executed (for example, operation 709 of FIG. 7); and, in response to identifying that the application is not being executed, disable the UWB antenna (for example, operation 711 of FIG. 7).

In an embodiment, the electronic device may further include: a second mmWave antenna module (for example, the second mmWave antenna module 344 of FIG. 3) including a second array antenna (for example, the second array antenna 345 of FIG. 3) and electrically connected with the IF circuit; and a third mmWave antenna module (for example, the third mmWave antenna module 346 of FIG. 3) including a third array antenna (for example, the third array antenna 347 of FIG. 3) and electrically connected with the IF circuit, and the at least one processor may, in response to identifying that the application is being executed, detect a first reference signal received power (RSRP) which is based on a signal acquired by using the second mmWave antenna module, and a second RSRP which is based on a signal acquired by using the third mmWave antenna module (for example, operation 713 of FIG. 7).

In an embodiment, the at least one processor may: identify whether a difference between the first RSRP and the second RSRP is less than or equal to a first threshold value (for example, operation 715 of FIG. 7); and, when the difference between the first RSRP and the second RSRP is less than or equal to the first threshold value (for example, 'yes' in operation 715 of FIG. 7), disable the first mmWave antenna module, and enable any one of the second mmWave antenna module and the third mmWave antenna module that has a greater RSRP, based on the first RSRP and the second RSRP (for example, operation 719 of FIG. 7).

In an embodiment, the at least one processor may: when the difference between the first RSRP and the second RSRP exceeds the first threshold value (for example, 'no' in operation 715 of FIG. 7), identify whether the first RSRP and the second RSRP exceed a second threshold value (for example, operation 717 of FIG. 7); when the first RSRP and the second RSRP exceed the second threshold value (for example, 'yes' in operation 717 of FIG. 7), disable the first mmWave antenna module, and enable any one of the second mmWave antenna module and the third mmWave antenna module that has a great RSRP, based on the first RSRP and the second RSRP (for example, operation 719 of FIG. 7).

In an embodiment, when the first RSRP and the second RSRP are less than or equal to the second threshold value (for example, 'no' in operation 717 of FIG. 7), the at least one processor may stop communication using the first mmWave antenna module (for example, operation 721 of FIG. 7).

In an embodiment, the first mmWave antenna module may include: a printed circuit board (for example, the printed circuit board 610 of FIG. 6) including a plurality of layers; and a radio frequency (RF) circuit (for example, the RFIC 652 of FIG. 6) disposed on any one of the plurality of layers.

In an embodiment, the first frequency band may be 8 GHz-11 GHz inclusive, and the second frequency band may be 7 GHz-10 GHz inclusive.

Figure 8:
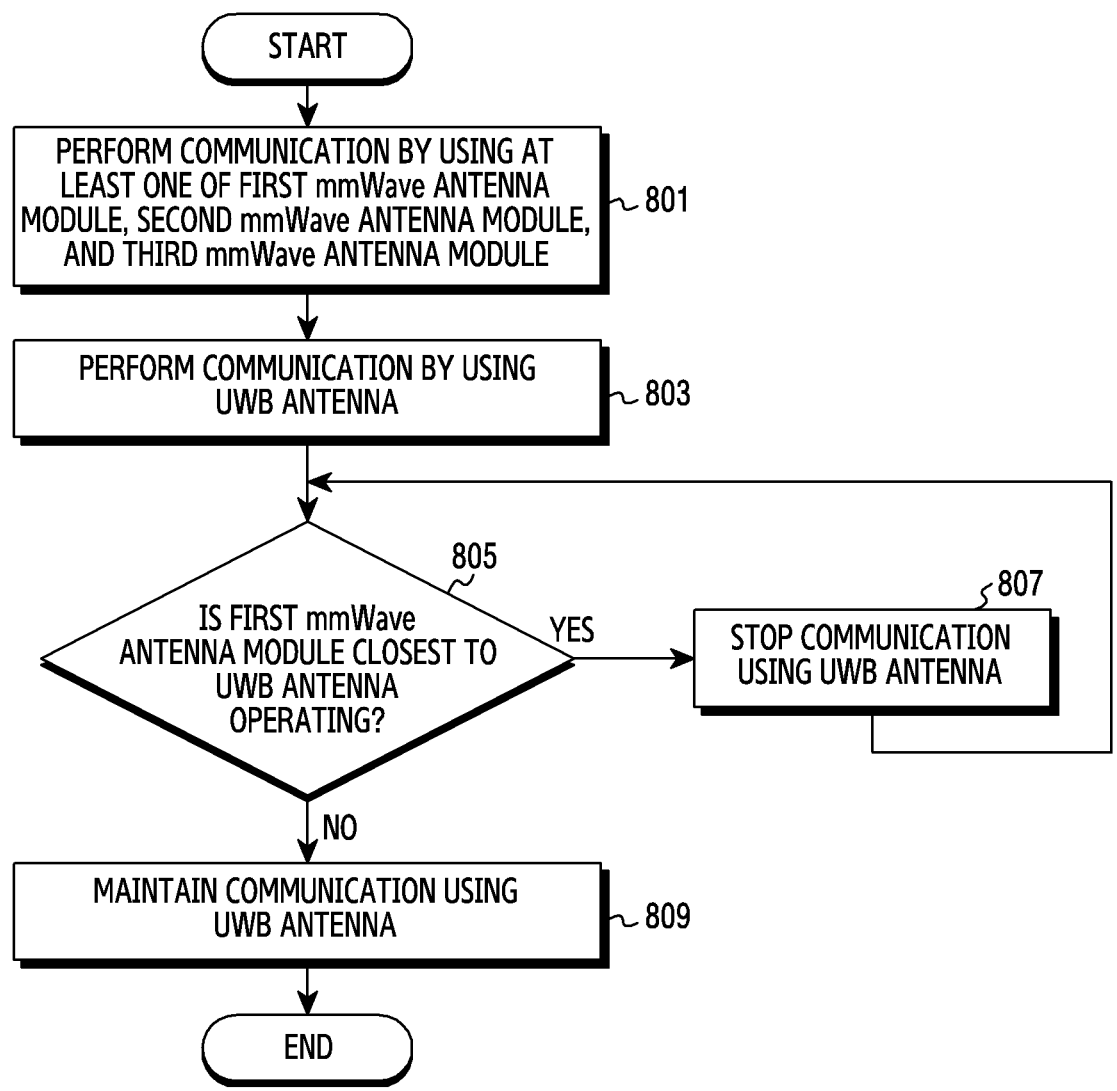
FIG. 8 is a flowchart illustrating a method for an electronic device to perform wireless communication according to an embodiment of the disclosure.

FIG. 8 is a flowchart illustrating a method for an electronic device to perform wireless communication according to an embodiment of the disclosure.

Operations of FIG. 8 may be performed by the electronic device 301 and the processor 320 of the electronic device 301 of FIG. 3.

Referring to FIG. 8, in operation 801, the electronic device 301 may perform communication by using at least one of the first mmWave antenna module 342, the second mmWave antenna module 344, and the third mmWave antenna module 346. For example, the processor 320 of the electronic device 301 may perform communication by using at least one of the first mmWave antenna module 342, the second mmWave antenna module 344, and the third mmWave antenna module 346. The processor 320 performing communication by using at least one of the first mmWave antenna module 342, the second mmWave antenna module 344, and the third mmWave antenna module 346 may be understood as the processor 320 performing wireless communication by using the 5G communication system 303. In an embodiment, when performing the communication, the processor 320 may control the IFIC 334 to provide a signal of a first designated band (for example, an IF signal) to at least one of the first mmWave antenna module 342, the second mmWave antenna module 344, and the third mmWave antenna module 346. For example, when performing the communication, the processor 320 may control the IFIC 344 to provide the signal of the first designated band to the first mmWave antenna module 342 through the first path A.

In operation 803, the electronic device 301 may perform communication by using a UWB antenna. For example, the processor 320 of the electronic device 301 may perform communication by using a UWB antenna (for example, the first antenna 362 and/or the second antenna 364). The processor 320 performing communication by using the UWB antenna may be understood as the processor 320 performing wireless communication by using the UWB communication system 302. For example, when performing communication by using the UWB antenna, the processor 320 may control the UWB IC 350 to receive an RF signal of the second designated frequency band through the second antenna 364.

In an embodiment, operation 803 may precede operation 801. In another embodiment, operation 803 may be performed substantially at the same time as operation 801.

In operation 805, the electronic device 301 may identify whether the first mmWave antenna module 342 closest to the UWB antenna is operating. For example, the processor 320 may identify whether the first mmWave antenna module 342 that is closest to the second antenna 364 among the mmWave antenna modules is operating. When the processor 320 identifies that the first mmWave antenna module 342 is operating in operation 805, the processor 320 may perform operation 807, and, when it is identified otherwise, the processor 320 may perform operation 809.

In operation 807, the electronic device 301 may stop communication using the UWB antenna. For example, the processor 320 of the electronic device 301 may stop communication using the UWB antenna (for example, communication using the UWB communication system 302) in response to it being identified that the first mmWave antenna module 342 is operating. For example, the processor 320 may stop the communication using the UWB antenna by changing at least one of components of the UWB communication system 302 to go into a disabled state.

The electronic device 301 may perform operation 805 again after performing operation 809.

In operation 809, the electronic device 301 may maintain the communication using the UWB antenna. For example, the processor 320 may maintain a connection state of wireless communication established with an external device by using the UWB communication system 302 in response to it being identified that the first mmWave antenna module 342 is not operating.

According to an embodiment, an electronic device (for example, the electronic device 301 of FIG. 3) may include: a first millimeter wave (mmWave) antenna module (for example, the first mmWave antenna module 342 of FIG. 3) including a first array antenna (for example, the first array antenna 343 of FIG. 3); a second mmWave antenna module (for example, the second mmWave antenna module 344 of FIG. 3) including a second array antenna (for example, the second array antenna 345 of FIG. 3); a third mmWave antenna module (for example, the third mmWave antenna module 346 of FIG. 3) including a third array antenna (for example, the third array antenna 347 of FIG. 3); an intermediate frequency (IF) circuit (for example, the IFIC 334 of FIG. 3) electrically connected with the first mmWave antenna module, the second mmWave antenna module, and the third mmWave antenna module; an ultra-wide band (UWB) antenna (for example, the second antenna 364 of FIG. 3) disposed closer to the first mmWave antenna module than to the second mmWave antenna module and the third mmWave antenna module; a UWB circuit (for example, the UWB IC 350 of FIG. 3) electrically connected with the UWB antenna; and at least one processor (for example, the processor 320 of FIG. 3) electrically connected with the IF circuit and the UWB circuit, and the at least one processor may: perform communication by using at least one of the first mmWave antenna module, the second mmWave antenna module, and the third mmWave antenna module (for example, operation 801 of FIG. 8); perform communication by using the UWB antenna (for example, operation 803 of FIG. 8); identify whether the first mmWave antenna module is operating (for example, operation 805 of FIG. 8); in response to identifying that the first mmWave antenna module is operating, stop the communication using the UWB antenna (for example, operation 807 of FIG. 8); and, in response to identifying that the first mmWave antenna module is not operating, maintain the communication using the UWB antenna (for example, operation 809 of FIG. 8).

According to an embodiment, when the communication using at least one of the first mmWave antenna module, the second mmWave antenna module, and the third mmWave antenna module is performed, the at least one processor may control the IFIC to provide a signal of a first designated frequency band to at least one of the first mmWave antenna module, the second mmWave antenna module, and the third mmWave antenna module.

In an embodiment, when the communication using the UWB antenna is performed, the at least one processor may control the UWB circuit to receive an RF signal of a second designated frequency band through the UWB antenna, and the second designated frequency band may overlap the first designated frequency band in part.

In an embodiment, the first mmWave antenna module may include: a printed circuit board (for example, the printed circuit board 610 of FIG. 6) including a plurality of layers; and a radio frequency (RF) circuit (for example, the RFIC 652 of FIG. 6) disposed on any one of the plurality of layers.

In an embodiment, the first frequency band may be 8 GHz-11 GHz inclusive, and the second frequency band may be 7 GHz-10 GHz inclusive.

Figure 9:
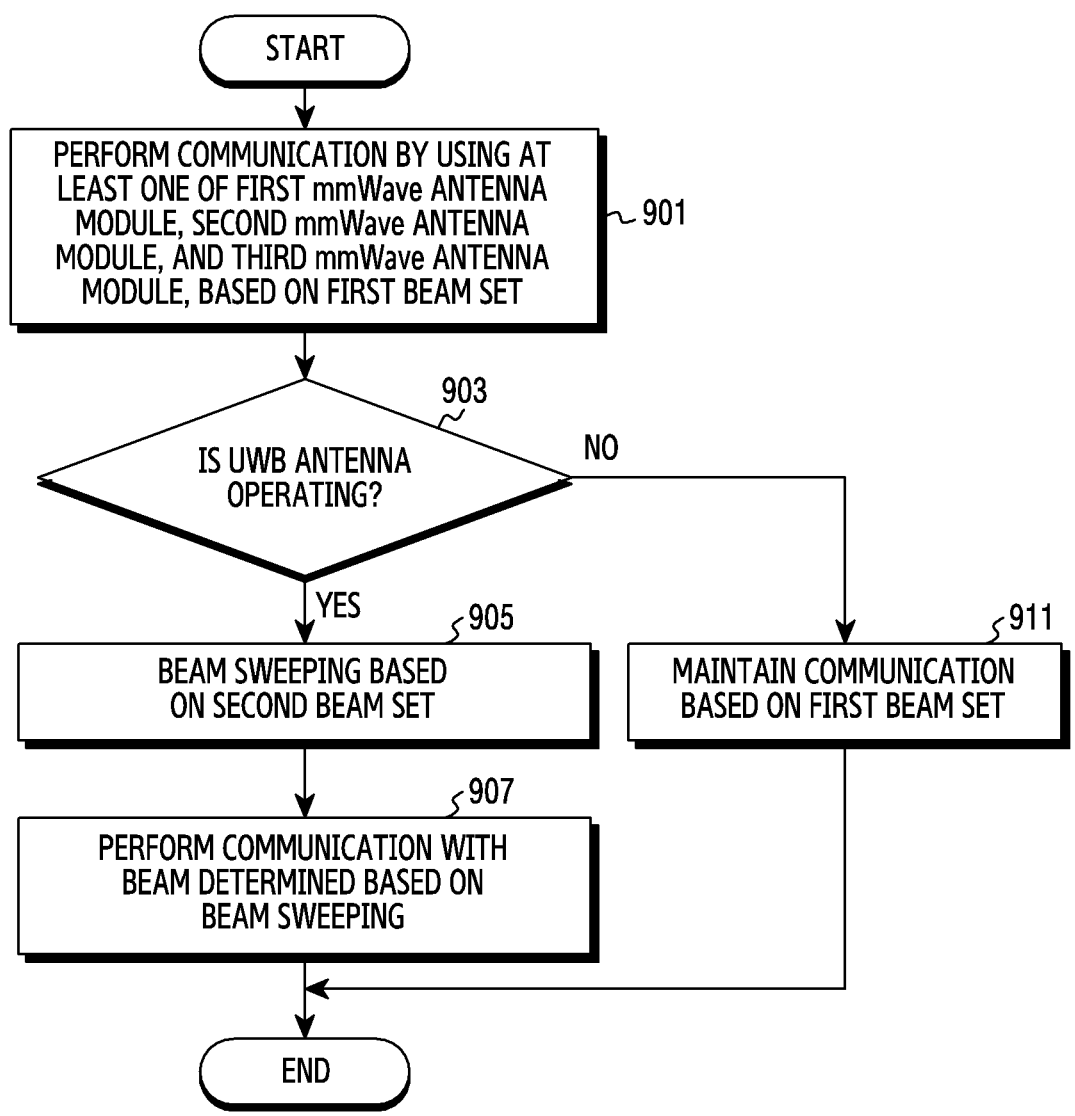
FIG. 9 is a flowchart illustrating a method for an electronic device to perform wireless communication according to an embodiment of the disclosure.

FIG. 9 is a flowchart illustrating a method for an electronic device to perform wireless communication according to an embodiment of the disclosure.

Figure 10A:
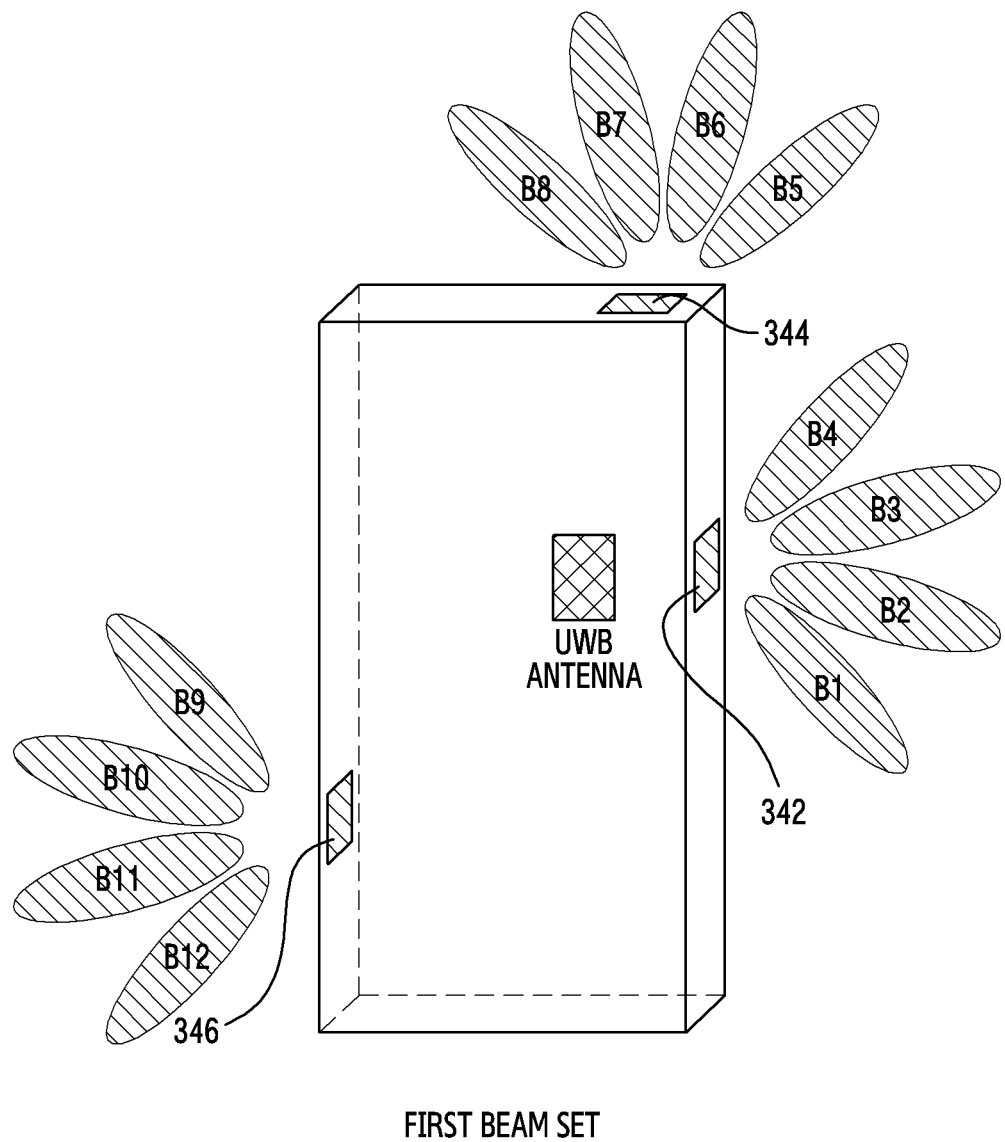
FIG. 10A is a view illustrating an example of communication performed by using a first beam set for mmWave antenna modules in an electronic device according to an embodiment of the disclosure.

FIG. 10A is a view illustrating an example of communicating by using a first beam set regarding mmWave antenna modules in an electronic device according to an embodiment of the disclosure.

Figure 10B:
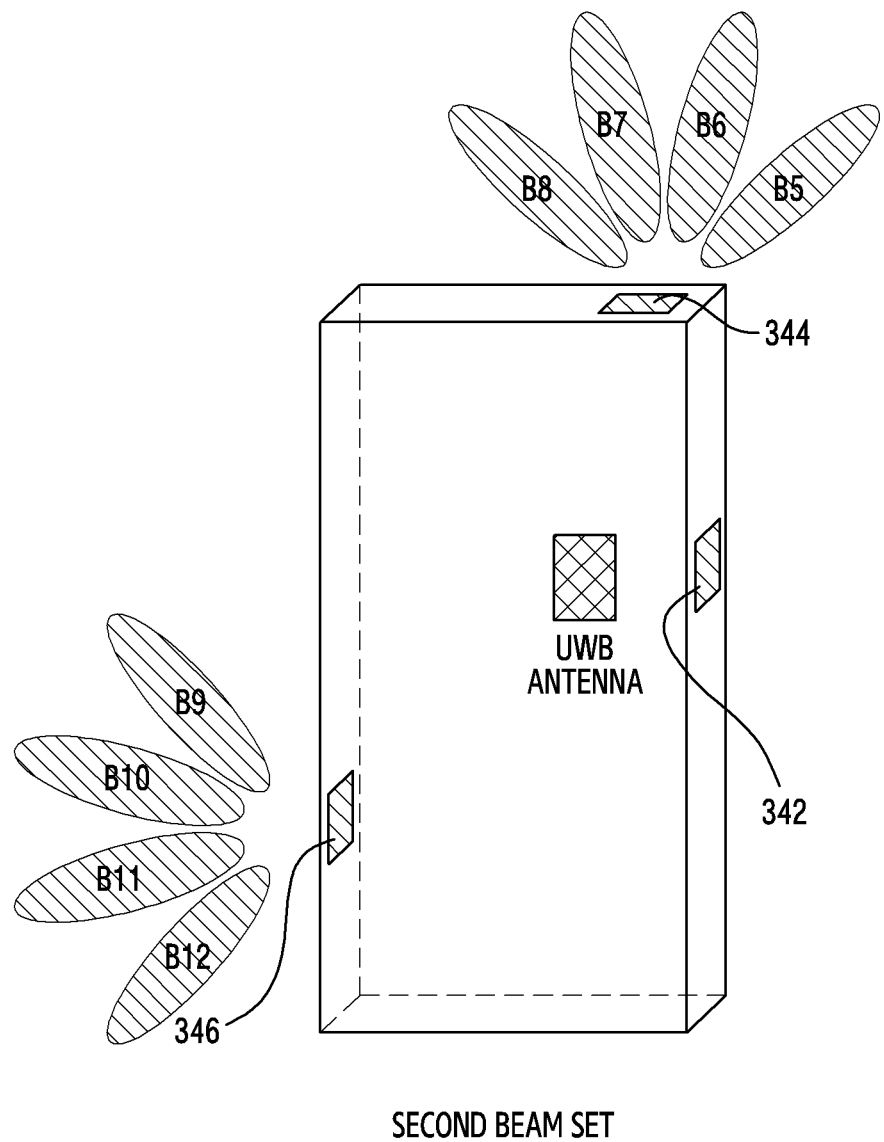
FIG. 10B is a view illustrating an example of communication performed by using a second beam set for mmWave antenna modules in an electronic device according to an embodiment of the disclosure.

FIG. 10B is a view illustrating an example of communicating by using a second beam set regarding mmWave antenna modules in an electronic device according to an embodiment of the disclosure.

Operations of FIG. 9 may be performed by the electronic device 301 and the processor 320 of the electronic device 301 of FIG. 3.

Referring to FIG. 9, in operation 901, the processor 320 may perform communication by using at least one of the first mmWave antenna module 342, the second mmWave antenna module 344, and the third mmWave antenna module 346, based on a first beam set. For example, referring to FIG. 10A, the first beam set may include beams B1, B2, B3, and B4 of the first mmWave antenna module 342, beams B5, B6, B7, and B8 of the second mmWave antenna module 344, and beams B9, B10, B11, and B12 of the third mmWave antenna module 346. In an embodiment, the processor 320 may perform beam sweeping based on the first beam set. In an embodiment, the processor 320 may perform communication with a beam that is determined through beam sweeping based on the first beam set. For example, the processor 320 may measure strengths of base station signals received with respective beams through beam sweeping, and may determine a beam that has the greatest signal strength, and may perform communication with the determined beam. In an embodiment, an order of beam sweeping regarding the first beam set which is performed by the processor 320 may be variable. For example, the processor 320 may perform beam sweeping for each mmWave antenna module, or may perform beam sweeping according to an order that is already determined for an index of each beam.

In an embodiment, information regarding the first beam set may be stored in a memory (for example, the memory 130 of FIG. 1) of the electronic device 301. The information regarding the first beam set may include a beam table that stores a value of an optimized beam as a register value of a phase shifter with respect to a coverage of each mmWave antenna module. The information regarding the first beam set may include identifiers (ID) of respective beams B1 to B12 included in the first beam set, and beam setting values corresponding to the IDs, respectively. While performing communication based on the first beam set, the electronic device 301 may use the beam setting value as a register value of a phase shifter of an mmWave antenna module corresponding to the corresponding beam. The above-described explanation may be applied to a second beam set, which will be described below, in substantially the same way, similar way, or corresponding way.

In an embodiment, the number of beams corresponding to each of the first mmWave antenna module 342, the second mmWave antenna module 344, and the third mmWave antenna module 346, and directions thereof are not limited to the illustrated example, and various design changes may be made according to a communication coverage to be covered. For example, the first mmWave antenna module 342 may form 5 beams, differently from the illustration. In another example, an angle between beams B1 to B4 of the first mmWave antenna module 342 may be different from the illustration. The above-described explanation may be applied to the second beam set, which will be described below, in substantially the same way, similar way, or corresponding way.

In operation 903, the processor 320 may identify whether a UWB antenna (for example, the first antenna 362 and/or the second antenna 364) is operating. For example, while performing communication based on the first beam set, the processor 320 may identify whether the UWB antenna is operating. When it is identified that the UWB antenna is operating in operation 903, the processor 320 may perform operation 905, and, when it is identified otherwise, the processor 320 may perform operation 907.

In operation 905, the processor 320 may perform beam sweeping based on the second beam set. For example, when it is identified that the UWB antenna is operating, the processor 320 may perform beam sweeping based on the second beam set. For example, the processor 320 may change the beam set currently used for communication from the first beam set to the second beam set, and may perform beam sweeping based on the second beam set. For example, referring to FIG. 10B, the second beam set may not include a beam of an mmWave antenna module (for example, the first mmWave antenna module 342) that is closest to the UWB antenna among the mmWave antenna modules. For example, the second beam set may include beams B5 to B8 of the second mmWave antenna module 344, and beams B9 to B12 of the third mmWave antenna module 346. A coverage of the second beam set may be different from a coverage of the first beam set. For example, since the second beam set does not include the beam regarding the first mmWave antenna module 342, the coverage of the second beam set may be smaller than the coverage of the first beam set.

In operation 907, the processor 320 may perform communication with a beam that is determined based on the beam sweeping. For example, the processor 320 may measure strengths of base station signals received with respective beams through the beam sweeping based on the second beam set, and may determine a beam that has the greatest signal strength, and may perform communication with the determined beam. In an embodiment, an order of beam sweeping regarding the second beam set which is performed by the processor 320 may be variable. For example, the processor 320 may perform beam sweeping for each mmWave antenna module, or may perform beam sweeping according to an order already determined for an index of each beam. In an embodiment, the processor 320 may finish performing operations after operation 907. In another embodiment, the processor 320 may perform operation 903 again after operation 907, differently from the illustration of FIG. 9.

In operation 911, the processor 320 may maintain the communication based on the first beam set. For example, when it is identified that the UWB antenna is not operating (for example, no in operation 903) while communication is performed based on the first beam set (for example, operation 901), the processor 320 may maintain the communication based on the first beam set. In an embodiment, the processor 320 may finish performing operations after operation 911. In another embodiment, the processor 320 may perform operation 903 again after operation 911, differently from the illustration of FIG. 9.

According to an embodiment, an electronic device (for example, the electronic device 301 of FIG. 3) may include: a first millimeter wave (mmWave) antenna module (for example, the first mmWave antenna module 342 of FIG. 3) including a first array antenna (for example, the first array antenna 343 of FIG. 3); a second mmWave antenna module (for example, the second mmWave antenna module 344 of FIG. 3) including a second array antenna (for example, the second array antenna 345 of FIG. 3); a third mmWave antenna module (for example, the third mmWave antenna module 346 of FIG. 3) including a third array antenna (for example, the third array antenna 347 of FIG. 3); an intermediate frequency (IF) circuit (for example, the IFIC 334 of FIG. 3) electrically connected with the first mmWave antenna module, the second mmWave antenna module, and the third mmWave antenna module; an ultra-wide band (UWB) antenna (for example, the second antenna 364 of FIG. 3) disposed closer to the first mmWave antenna module than to the second mmWave antenna module and the third mmWave antenna module; a UWB circuit (for example, the UWB IC 350 of FIG. 3) electrically connected with the UWB antenna; and at least one processor (for example, the processor 320 of FIG. 3) electrically connected with the IF circuit and the UWB circuit, and the at least one processor may: perform communication by using at least one of the first mmWave antenna module, the second mmWave antenna module, and the third mmWave antenna module, based on a first beam set (for example, operation 901 of FIG. 9); identify whether the UWB antenna is operating while performing the communication based on the first beam set (for example, operation 903 of FIG. 9); and maintain the communication based on the first beam set (for example, operation 911 of FIG. 9) or perform communication based on a second beam set (for example, operation 905 and operation 907 of FIG. 9), based on the identification.

In an embodiment, the first beam set may include beams regarding the first mmWave antenna module, the second mmWave antenna module, and the third mmWave antenna module, and the second beam set may not include a beam regarding the first mmWave antenna module.

In an embodiment, when it is identified that the UWB antenna is operating (for example, 'yes' in operation 903 of FIG. 9), the at least one processor may perform beam sweeping based on the second beam set (for example, operation 905 of FIG. 9), and may perform communication with a beam that is determined based on the beam sweeping (for example, operation 907 of FIG. 9).

In an embodiment, when it is identified that the UWB antenna is operating, the at least one processor may change the beam set currently used for communication from the first beam set to the second beam set, and may perform the beam sweeping based on the changed second beam set, and, when it is identified that the UWB antenna is not operating (for example, 'no' in operation 903 of FIG. 9), the at least one processor may maintain the communication based on the first beam set (for example, operation 911 of FIG. 9).

The effect achieved in the disclosure is not limited to those mentioned above, and other effects that are not mentioned above may be clearly understood to those skilled in the art based on the description provided below.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first mmWave antenna module comprising a first array antenna wherein the first mmWave antenna is configured to receive a signal of a first frequency band;
an intermediate frequency (IF) circuit electrically connected with the first mmWave antenna module through a first path;
an ultra-wide band (UWB) antenna disposed adjacent to the first path wherein the UWB antenna is configured to receive a signal of a second frequency band;
a UWB circuit electrically connected with the UWB antenna;
third antenna for short-range wireless communication distinct from the first array antenna and the UWB antenna wherein the third antenna is configured to receive a signal of a third frequency band which does not overlap the first frequency band;
memory, comprising one or more storage media, storing instructions; and
at least one processor communicatively connected with the IF circuit, the UWB circuit, the third antenna, and the memory,
wherein the instructions, when executed by the at least one processor individually or collectively, cause the electronic device to:
control the IF circuit to provide a signal of a first frequency band to the first mmWave antenna module,
control the UWB circuit to acquire a signal of a second frequency band overlapping the first frequency band in part through the UWB antenna, and
in case that an error occurs in UWB communication while both an operation using the UWB communication and an operation using a mmWave (5G) communication are functioning and the third antenna is not being used for the short-range wireless communication in the third frequency band, perform the UWB communication using the third antenna instead of the UWB antenna, and
wherein the error occurs in a process of modulating or demodulating a signal transmitted or received in the UWB communication.

2. The electronic device of claim 1, wherein the instructions that, when executed by the at least one processor individually or collectively, further cause the electronic device to:
identify whether an error of data which is based on a signal acquired through the UWB antenna occurs;
in response to identifying that the error occurs, identify whether an application related to detection of a position of an external device is being executed; and
in response to identifying that the application is not being executed, disable the UWB antenna.

3. The electronic device of claim 2, further comprising:
a second mmWave antenna module comprising a second array antenna and electrically connected with the IF circuit; and
a third mmWave antenna module comprising a third array antenna and electrically connected with the IF circuit,
wherein the instructions that, when executed by the at least one processor individually or collectively, further cause the electronic device to, in response to identifying that the application is being executed, detect a first reference signal received power (RSRP) which is based on a signal acquired by using the second mmWave antenna module, and a second RSRP which is based on a signal acquired by using the third mmWave antenna module.

4. The electronic device of claim 3, wherein the instructions that, when executed by the at least one processor individually or collectively, further cause the electronic device to:
identify whether the first RSRP and the second RSRP exceed a threshold value;
when the first RSRP and the second RSRP exceed the threshold value, disable the first mmWave antenna module and enable one of the second mmWave antenna module or the third mmWave antenna module that has a great RSRP; and
when the first RSRP and the second RSRP are less than or equal to the threshold value, stop communication using the first mmWave antenna module.

5. The electronic device of claim 1, wherein the instructions that, when executed by the at least one processor individually or collectively, further cause the electronic device to:
identify whether an error rate of data which is based on a signal acquired through the UWB antenna exceeds a threshold value,
in response to identifying that the error rate exceeds the threshold value, identify whether the third antenna is operating, and
when the third antenna is not operating, control the UWB circuit to acquire a signal of a third frequency band which does not overlap the first frequency band through the third antenna.

6. The electronic device of claim 5, wherein the instructions that, when executed by the at least one processor individually or collectively, further cause the electronic device to:
when the third antenna is operating, identify whether an application related to detection of a position of an external device is being executed; and
in response to identifying that the application is not being executed, disable the UWB antenna.

7. The electronic device of claim 6, further comprising:
a second mmWave antenna module comprising a second array antenna and electrically connected with the IF circuit; and
a third mmWave antenna module comprising a third array antenna and electrically connected with the IF circuit,
wherein the instructions that, when executed by the at least one processor individually or collectively, further cause the electronic device to, in response to identifying that the application is being executed, detect a first reference signal received power (RSRP) which is based on a signal acquired by using the second mmWave antenna module, and a second RSRP which is based on a signal acquired by using the third mmWave antenna module.

8. The electronic device of claim 7, wherein the instructions that, when executed by the at least one processor individually or collectively, further cause the electronic device to:
identify whether a difference between the first RSRP and the second RSRP is less than or equal to a first threshold value; and
when the difference between the first RSRP and the second RSRP is less than or equal to the first threshold value, disable the first mmWave antenna module, and enable one of the second mmWave antenna module or the third mmWave antenna module that has a greater RSRP, based on the first RSRP and the second RSRP.

9. The electronic device of claim 8, wherein the instructions that, when executed by the at least one processor individually or collectively, further cause the electronic device to:
when the difference between the first RSRP and the second RSRP exceeds the first threshold value, identify whether the first RSRP and the second RSRP exceed a second threshold value; and
when the first RSRP and the second RSRP exceed the second threshold value, disable the first mmWave antenna module, and enable one of the second mmWave antenna module or the third mmWave antenna module that has a great RSRP, based on the first RSRP and the second RSRP.

10. The electronic device of claim 9, wherein the instructions that, when executed by the at least one processor individually or collectively, further cause the electronic device to, when the first RSRP and the second RSRP are less than or equal to the second threshold value, stop communication using the first mmWave antenna module.

11. The electronic device of claim 1, wherein the first mmWave antenna module comprises:
a printed circuit board comprising a plurality of layers; and
a radio frequency (RF) circuit disposed on one of the plurality of layers.

12. The electronic device of claim 1,
wherein the first frequency band is 8 GHZ-11 GHz inclusive, and
wherein the second frequency band is 7 GHz-10 GHz inclusive.

13. The electronic device of claim 3, wherein the ultra-wide band (UWB) antenna is disposed closer to the first mmWave antenna module than to the second mmWave antenna module and the third mmWave antenna module.

14. The electronic device of claim 13, wherein the instructions that, when executed by the at least one processor individually or collectively, further cause the electronic device to:
perform communication by using at least one of the first mmWave antenna module, the second mmWave antenna module, or the third mmWave antenna module;
perform communication by using the UWB antenna;
identify whether the first mmWave antenna module is operating;
in response to identifying that the first mmWave antenna module is operating, stop the communication using the UWB antenna; and
in response to identifying that the first mmWave antenna module is not operating, maintain the communication using the UWB antenna.

15. The electronic device of claim 14, wherein the instructions that, when executed by the at least one processor individually or collectively, further cause the electronic device to:
when the communication using at least one of the first mmWave antenna module, the second mmWave antenna module, or the third mmWave antenna module is performed, control the IF circuit to provide a signal of a first designated frequency band to at least one of the first mmWave antenna module, the second mmWave antenna module, or the third mmWave antenna module; and
when the communication using the UWB antenna is performed, control the UWB circuit to receive an RF signal of a second designated frequency band through the UWB antenna, wherein the second designated frequency band overlaps the first designated frequency band in part.

\* \* \* \* \*